US011772685B2

(12) United States Patent
Austrheim

(10) Patent No.: US 11,772,685 B2
(45) Date of Patent: Oct. 3, 2023

(54) SYSTEM FOR STORING AND TRANSPORTING STORAGE CONTAINERS

(71) Applicant: Autostore Technology AS, Nedre Vats (NO)

(72) Inventor: Trond Austrheim, Etne (NO)

(73) Assignee: Autostore Technology AS, Nedre Vats (NO)

( * ) Notice: Subject to any disclaimer, the term of this patent is extended or adjusted under 35 U.S.C. 154(b) by 291 days.

(21) Appl. No.: 17/055,051

(22) PCT Filed: Jun. 11, 2019

(86) PCT No.: PCT/EP2019/065141
§ 371 (c)(1),
(2) Date: Nov. 12, 2020

(87) PCT Pub. No.: WO2019/238639
PCT Pub. Date: Dec. 19, 2019

(65) Prior Publication Data
US 2021/0362950 A1    Nov. 25, 2021

(30) Foreign Application Priority Data

Jun. 12, 2018    (NO) .................................... 20180813
Jul. 19, 2018    (NO) .................................... 20181005
(Continued)

(51) Int. Cl.
*B65G 1/04*    (2006.01)
*B60W 50/00*    (2006.01)
(Continued)

(52) U.S. Cl.
CPC ......... *B60W 50/0098* (2013.01); *B61B 13/00* (2013.01); *B65G 1/0414* (2013.01);
(Continued)

(58) Field of Classification Search
CPC ..... B65G 1/0478; B65G 1/0464; B65G 1/065
See application file for complete search history.

(56) References Cited

U.S. PATENT DOCUMENTS 3,519,150 A    7/1970  Keena et al.
3,800,963 A    4/1974  Holland
(Continued)

FOREIGN PATENT DOCUMENTS

CA    2988122 A1    12/2016
CN    101553416 A    10/2009
(Continued)

OTHER PUBLICATIONS

Office Action in counterpart Chinese Patent Application No. 2019800538763 dated Dec. 6, 2021 (13 pages).
(Continued)

*Primary Examiner* — Mark C Hageman
(74) *Attorney, Agent, or Firm* — Osha Bergman Watanabe & Burton LLP

(57) ABSTRACT

A system for storing and transporting storage containers includes an automated storage and retrieval grid including vertical members defining multiple storage columns for storing storage containers on top of each other in vertical stacks. The vertical members are interconnected at their upper ends by a container handling vehicle rail system arranged to guide at least one container handling vehicle being configured to raise storage containers from, and lower storage containers into, the storage columns, and to transport the storage containers above the storage columns. The container handling vehicle rail system includes a first set of parallel rails arranged in a first horizontal plane and extending in a first direction, and a second set of parallel rails arranged in the first horizontal plane and extending in a
(Continued)

second direction which is orthogonal to the first direction, which first and second sets of rails form a grid pattern in the first horizontal plane including a plurality of adjacent container handling vehicle grid cells. Each container handling vehicle grid cell includes a container handling vehicle grid opening defined by a pair of neighboring rails of the first set of rails and a pair of neighboring rails of the second set of rails. A transfer column is adapted for transport of a storage container between the container handling vehicle and a delivery space is situated at a lower end of the transfer column. A delivery system includes a first delivery rail system having at least one set of parallel rails arranged in a second horizontal plane guiding at least one delivery vehicle thereon. The delivery vehicle is adapted to receive and/or deliver a storage container at a storage container delivery location arranged below the delivery space of the transfer column and to move between the storage container delivery location and a second location, the first delivery rail system covers at least an area extending from the storage container delivery location to the second location. A vehicle lift device is for transfer of the at least one delivery vehicle between a first lift stop position adjacent the second location in the second horizontal plane and a second lift stop position adjacent a third location arranged in a third horizontal plane being at a different vertical level than the second horizontal plane.

22 Claims, 12 Drawing Sheets

(30) Foreign Application Priority Data

Aug. 2, 2018 (NO) .................................... 20181039
Dec. 20, 2018 (NO) .................................... 20181657

(51) Int. Cl.
| | |
|---|---|
| *G05D 1/00* | (2006.01) |
| *B65G 1/06* | (2006.01) |
| *B66F 9/19* | (2006.01) |
| *B65G 1/137* | (2006.01) |
| *B65G 47/06* | (2006.01) |
| *B65G 47/52* | (2006.01) |
| *B65G 57/03* | (2006.01) |
| *B65G 63/06* | (2006.01) |
| *B65G 65/23* | (2006.01) |
| *B66F 9/06* | (2006.01) |
| *G05D 1/02* | (2020.01) |
| *B65G 67/24* | (2006.01) |
| *B65G 43/00* | (2006.01) |
| *B61B 13/00* | (2006.01) |
| *B65G 63/00* | (2006.01) |

(52) U.S. Cl.
CPC ......... *B65G 1/0457* (2013.01); *B65G 1/0464* (2013.01); *B65G 1/0471* (2013.01); *B65G 1/0478* (2013.01); *B65G 1/0485* (2013.01); *B65G 1/0492* (2013.01); *B65G 1/065* (2013.01); *B65G 1/1375* (2013.01); *B65G 43/00* (2013.01); *B65G 47/06* (2013.01); *B65G 47/52* (2013.01); *B65G 57/03* (2013.01); *B65G 63/06* (2013.01); *B65G 65/23* (2013.01); *B65G 67/24* (2013.01); *B66F 9/063* (2013.01); *B66F 9/19* (2013.01); *G05D 1/0011* (2013.01); *G05D 1/021* (2013.01); *G05D 1/0291* (2013.01); *B60W 2710/06* (2013.01); *B60W 2720/10* (2013.01); *B60W 2720/24* (2013.01); *B65G 1/1378* (2013.01); *B65G 63/004* (2013.01); *B65G 2201/0235* (2013.01); *B65G 2201/0258* (2013.01); *B65G 2203/0283* (2013.01); *B65G 2203/042* (2013.01); *G05D 1/02* (2013.01); *G05D 1/0229* (2013.01); *G05D 1/0231* (2013.01); *G05D 1/0259* (2013.01); *G05D 1/0289* (2013.01); *G05D 2201/0216* (2013.01)

(56) References Cited

U.S. PATENT DOCUMENTS

| | | | |
|---|---|---|---|
| 4,538,950 | A | 9/1985 | Shiomi et al. |
| 4,909,697 | A | 3/1990 | Bernard, II et al. |
| 5,538,809 | A | 7/1996 | Bittihn et al. |
| 7,101,139 | B1 | 9/2006 | Benedict |
| 8,628,289 | B1 | 1/2014 | Benedict et al. |
| 9,527,669 | B1 | 12/2016 | Hanssen et al. |
| 10,822,166 | B2 * | 11/2020 | Ingram-Tedd ....... B65G 1/1378 |
| 10,961,054 | B2 * | 3/2021 | Gravelle .............. B65G 1/0464 |
| 2003/0093176 | A1 | 5/2003 | Ohtsuka et al. |
| 2005/0047895 | A1 | 3/2005 | Lert |
| 2005/0118003 | A1 | 6/2005 | Mitchell et al. |
| 2011/0027059 | A1 | 2/2011 | Benedict et al. |
| 2012/0282068 | A1 | 11/2012 | Tschurwald et al. |
| 2014/0014470 | A1 | 1/2014 | Razumov |
| 2014/0086714 | A1 | 3/2014 | Malik |
| 2014/0277693 | A1 | 9/2014 | Naylor |
| 2014/0288696 | A1 | 9/2014 | Lert |
| 2014/0292274 | A1 | 10/2014 | Dorval et al. |
| 2014/0311858 | A1 | 10/2014 | Keating et al. |
| 2016/0060033 | A1 | 3/2016 | Izumi |
| 2016/0060037 | A1 | 3/2016 | Razumov |
| 2016/0145058 | A1 | 5/2016 | Lindbo |
| 2016/0176638 | A1 | 6/2016 | Toebes |
| 2016/0194151 | A1 | 7/2016 | Lindbo et al. |
| 2016/0272221 | A1 | 9/2016 | Tasaka et al. |
| 2016/0325932 | A1 | 11/2016 | Hognaland |
| 2017/0057745 | A1 | 3/2017 | Ueda et al. |
| 2017/0166400 | A1 | 6/2017 | Hofmann |
| 2018/0044110 | A1 | 2/2018 | Clarke et al. |
| 2018/0068253 | A1 | 3/2018 | Simms et al. |
| 2018/0082162 | A1 | 3/2018 | Durham et al. |
| 2018/0118078 | A1 | 5/2018 | Alkhaldi et al. |
| 2018/0141754 | A1 | 5/2018 | Garrett et al. |
| 2018/0150793 | A1 | 5/2018 | Lert, Jr. et al. |
| 2020/0148474 | A1 | 5/2020 | Salichs et al. |

FOREIGN PATENT DOCUMENTS

| | | | |
|---|---|---|---|
| CN | 101711210 | A | 5/2010 |
| CN | 102050333 | A | 5/2011 |
| CN | 102992012 | A | 3/2013 |
| CN | 104066661 | A | 9/2014 |
| CN | 104781163 | A | 7/2015 |
| CN | 104885106 | A | 9/2015 |
| CN | 105383848 | A | 3/2016 |
| CN | 105517923 | A | 4/2016 |
| CN | 105899398 | A | 8/2016 |
| CN | 105947514 | A | 9/2016 |
| CN | 106064718 | A | 11/2016 |
| CN | 106241154 | A | 12/2016 |
| CN | 106414278 | A | 2/2017 |
| CN | 106575391 | A | 4/2017 |
| CN | 106660703 | A | 5/2017 |
| CN | 106662874 | A | 5/2017 |
| CN | 106829298 | A | 6/2017 |
| CN | 206790852 | U | 12/2017 |
| CN | 108140168 | A | 6/2018 |
| DE | 40 16 810 | C1 | 11/1991 |
| DE | 9310690 | U1 | 9/1993 |
| DE | 102009017241 | A1 | 10/2010 |
| DE | 102009051800 | A1 | 5/2011 |
| DE | 102011014394 | A1 | 9/2012 |
| DE | 102013009340 | A1 | 12/2014 |

(56) References Cited

FOREIGN PATENT DOCUMENTS

| | | |
|---|---|---|
| EP | 0133472 A2 | 2/1985 |
| EP | 0458021 A1 | 11/1991 |
| EP | 2881905 A1 | 6/2015 |
| EP | 3003932 A1 | 4/2016 |
| GB | 1 267 751 A | 3/1972 |
| GB | 1 276 160 A | 6/1972 |
| GB | 2211822 A | 7/1989 |
| GB | 2233319 A | 1/1991 |
| JP | S6417707 A | 1/1989 |
| JP | H07-067623 B2 | 7/1995 |
| JP | H08-217209 A | 8/1996 |
| JP | H09152914 A | 6/1997 |
| JP | 2000-044010 A | 2/2000 |
| JP | 2000191106 A | 7/2000 |
| JP | 2003137406 A | 5/2003 |
| JP | 2009184775 A | 8/2009 |
| JP | 2011-102166 A | 5/2011 |
| JP | 2017-088404 A | 5/2017 |
| JP | 2017-524625 A | 8/2017 |
| KR | 20170026074 A | 3/2017 |
| NO | 317366 B1 | 10/2004 |
| RU | 2008111257 A | 10/2009 |
| WO | 96/14258 A1 | 5/1996 |
| WO | 2005/077789 A1 | 8/2005 |
| WO | 2012/106746 A1 | 8/2012 |
| WO | 2014/075937 A1 | 5/2014 |
| WO | 2014/090684 A1 | 6/2014 |
| WO | 2014/195901 A1 | 12/2014 |
| WO | 2014/203126 A1 | 12/2014 |
| WO | 2015/084236 A1 | 6/2015 |
| WO | 2015/140216 A1 | 9/2015 |
| WO | 2015/193278 A1 | 12/2015 |
| WO | 2015193278 A1 | 12/2015 |
| WO | 2016/166294 A1 | 10/2016 |
| WO | 2016/166323 A1 | 10/2016 |
| WO | 2016166294 A1 | 10/2016 |
| WO | 2016/196815 A1 | 12/2016 |
| WO | 2016/198467 A1 | 12/2016 |
| WO | 2017/081281 A1 | 5/2017 |
| WO | 2017081273 A1 | 5/2017 |
| WO | 2017/121512 A1 | 7/2017 |
| WO | 2017/144054 A1 | 8/2017 |
| WO | 2007/153563 A1 | 9/2017 |
| WO | 2017/211640 A1 | 12/2017 |
| WO | 2017/220651 A1 | 12/2017 |
| WO | 2018/162757 A1 | 9/2018 |

OTHER PUBLICATIONS

Office Action in counterpart Chinese Patent Application No. 2019800393798 dated Dec. 9, 2021 (17 pages).
Office Action issued in counterpart Chinese Application No. 201980039066.2 dated Sep. 10, 2021 (10 pages).
Search Report issued in counterpart Chinese Application No. 201980039066.2 dated Sep. 6, 2021 (3 pages).
Office Action in counterpart Chinese Patent Application No. 201980039028.7 dated Oct. 27, 2021 (15 pages).
Office Action in counterpart Chinese Patent Application No. 201980039046.5 dated Sep. 15, 2021 (18 pages).
Office Action in counterpart Chinese Patent Application No. 201980039068.1 dated Sep. 15, 2021 (23 pages).
Office Action in counterpart Chinese Patent Application No. 201980038856.9 dated Oct. 19, 2021 (16 pages).
Office Action issued in the counterpart Chinese Patent Application No. 201980037723X, dated Sep. 17, 2021 (25 pages).
Office Action issued in the counterpart Chinese Patent Application No. 2019800383353, dated Dec. 17, 2021 (3 pages).
International Search Report issued in PCT/EP2019/065141 dated Sep. 12, 2019 (6 pages).
Written Opinion of the International Searching Authority issued in PCT/EP2019/065141 dated Sep. 12, 2019 (9 pages).
Norwegian Search Report issued in NO 20181039 dated Sep. 20, 2018 (3 pages).
Norwegian Search Report issued in NO 20181005 dated Feb. 6, 2019 (2 pages).
Norwegian Search Report issued in NO 20181657 dated Jun. 4, 2019 (2 pages).
Office Action issued in Chinese Application No. 201980037162.3; dated Sep. 27, 2021 (8 pages).
Extended European Search Report issued in European Application No. 21186410.3, dated Nov. 25, 2021 (5 pages).
Office Action in counterpart Chinese Patent Application No. 201980039693.6 dated Oct. 18, 2021 (12 pages).
Office Action in counterpart Chinese Patent Application No. 201980038106.1 dated Sep. 8, 2021 (10 pages).
United States Office Action in related U.S. Appl. No. 16/972,482, dated Mar. 22, 2022 (46 pages).
International Search Report issued in PCT/EP2019/065153 dated Sep. 12, 2019 (15 pages).
International Search Report issued in PCT/EP2019/065166 dated Sep. 12, 2019 (17 pages).
International Search Report issued in PCT/EP2019/065233 dated Sep. 12, 2019 (16 pages).
Office Action issued in counterpart Japanese Patent Application No. 2020-568727 dated Mar. 30, 2023 (8 pages).
Office Action in the counterpart Japanese Application No. 2020-569128, dated Jul. 3, 2023 (6 pages).
Office Action issued in counterpart Japanese Patent Application No. 2020-568698 dated May 29, 2023 (9 pages).

* cited by examiner

SYSTEM FOR STORING AND TRANSPORTING STORAGE CONTAINERS

TECHNICAL FIELD

The present invention relates to a system for storing and transporting storage containers and a method for operating the system.

Background and Prior Art

FIGS. 1(a) and 2(a) disclose a typical prior art automated storage and retrieval system 100 with a framework structure. FIGS. 1(b) and 2(b) disclose prior art container handling vehicles 3a operating the automated storage and retrieval system 100 disclosed in FIGS. 1(a) and 2(a), respectively.

The framework structure defines a storage grid 104 comprising a plurality of upright/vertical members 102 and optionally a plurality of horizontal members 103 supporting the upright members 102. The members 102, 103 may typically be made of metal, e.g. extruded aluminium profiles.

The storage grid 104 comprises multiple grid columns 112. A large majority of the grid columns are also termed storage columns 105, in which storage containers 106, also known as bins, are stacked one on top of another to form stacks 107.

Each storage container 106 may typically hold a plurality of product items (not shown), and the product items within a storage container 106 may be identical or may be of different product types depending on the application.

The storage grid 104 guards against horizontal movement of the of storage containers 106 in the stacks 107, and guides vertical movement of the containers 106, but does normally not otherwise support the storage containers 106 when stacked.

The automated storage and retrieval system 100 comprises a rail system 108 (or a top rail grid) arranged in a grid pattern across the top of the storage grid 104, on which rail system 108 a plurality of storage container handling vehicles 3a (as exemplified in FIGS. 1(b) and 2(b)) are operated to raise storage containers 106 from, and lower storage containers 106 into, the storage columns 105, and also to transport the storage containers 106 above the storage columns 105.

The rail system 108 comprises a first set of parallel rails 110 arranged to guide movement of the storage container handling vehicles 3a in a first direction X across the top of the rail system 108, and a second set of parallel rails 111 arranged perpendicular to the first set of rails 110 to guide movement of the container handling vehicles 3a in a second direction Y which is perpendicular to the first direction X. In this way, the rail system 108 defines the upper ends of the grid columns 112 above which the storage container handling vehicles 3a can move laterally, i.e. in a plane which is parallel to the horizontal X-Y plane. Commonly, at least one of the sets of rails 110, 111 is made up of dual-track rails allowing two container handling vehicles to pass each other on neighbouring grid cells 122. Dual-track rails are well-known and disclosed in for instance WO 2015/193278 A1 and WO 2015/140216 A1.

The horizontal extent of one of the grid cells 122 constituting the grid pattern is in FIGS. 1(a) and 2(a) marked by thick lines.

Each grid cell 122 has a width which is typically within the interval of 30 to 150 cm, and a length which is typically within the interval of 50 to 200 cm. Each grid opening 115 has a width and a length which is typically 2 to 10 cm less than the width and the length of the grid cell 122 due to the horizontal extent of the rails 110, 111.

Each prior art container handling vehicle 3a comprises a vehicle body and a wheel arrangement of eight wheels 6, wherein a first set of four wheels enable the lateral movement of the container handling vehicles 3a in the X direction and a second set of the remaining four wheels enable the lateral movement in the Y direction. One or both sets of wheels in the wheel arrangement can be lifted and lowered, so that the first set of wheels and/or the second set of wheels can be engaged with the respective set of rails 110, 111 at any one time.

Each prior art container handling vehicle 3a also comprises a lifting device (not shown) for vertical transportation of storage containers 106, e.g. raising a storage container 106 from, and lowering a storage container 106 into, a storage column 105. The lifting device comprises one or more gripping/engaging devices (not shown) which are adapted to engage a storage container 106, and which gripping/engaging devices can be lowered from the vehicle 3a so that the position of the gripping/engaging devices with respect to the vehicle 3a can be adjusted in a third direction Z which is orthogonal the first direction X and the second direction Y.

Conventionally, and also for the purpose of this application, $Z=1$ identifies the uppermost layer of the grid 104, i.e. the layer immediately below the rail system 108, $Z=2$ the second layer below the rail system 108, $Z=3$ the third layer etc. In the prior art storage grid disclosed in FIGS. 1A and 2A, $Z=8$ identifies the lowermost, bottom layer of the grid 104. Consequently, as an example, and using the Cartesian coordinate system X, Y, Z indicated in FIGS. 1(a) and 2(a). The storage container identified as 106' in FIG. 1(a) can be said to occupy grid location or cell $X=10$, $Y=2$, $Z=3$. The container handling vehicles 3a can be said to travel in layer $Z=0$ and each grid column can be identified by its X and Y coordinates.

Each container handling vehicle 3a comprises a storage compartment or space (not shown) for receiving and stowing a storage container 106 when transporting the storage container 106 across the top of the storage grid 104. The storage space may comprise a cavity arranged centrally within the vehicle body, e.g. as is described in WO2014/090684A1, the contents of which are incorporated herein by reference.

Alternatively, the container handling vehicles 3a may have a cantilever construction as described in NO317366, the contents of which are also incorporated herein by reference.

The container handling vehicles 3a may have a footprint, i.e. an extent in the X and Y directions, which is generally equal to the horizontal area of a grid cell 122, i.e. the extent of a grid cell 122 in the X and Y directions, e.g. as is described in WO2015/193278A1, the contents of which are incorporated herein by reference.

Alternatively, the container handling vehicles 3a may have a footprint which is larger than the horizontal area of a grid cell 122, e.g. as is disclosed in WO2014/090684A1.

The rail system 108 may be a single rail system, as is shown in FIG. 3(a). Alternatively, the rail system 108 may be a double rail system, as is shown in FIG. 3(b), thus allowing a container handling vehicle 3a having a footprint generally corresponding to the lateral area defined by a grid column 112 to travel along a row of grid columns even if another container handling vehicle 3a is positioned above a grid column neighboring that row. Both the single and double rail system, or a combination comprising a single and double rail arrangement in a single rail system 108, forms a grid pattern in the horizontal plane P comprising a plurality of rectangular and uniform grid locations or grid cells 122, where each grid cell 122 comprises a grid opening 115 being delimited by a pair of rails 110a, 110b of the first rails 110 and a pair of rails 111a, 111b of the second set of rails 111. In FIG. 3(c) the grid cell 122 is indicated by a dashed box.

Consequently, rails 110a and 110b form pairs of rails defining parallel rows of grid cells running in the X direction, and rails 111a and 111b form pairs of rails defining parallel rows of grid cells running in the Y direction.

As shown in FIG. 3(c), each grid cell 122 has a width Wc which is typically within the interval of 30 to 150 cm, and a length Lc which is typically within the interval of 50 to 200 cm. Each grid opening 115 has a width Wo and a length Lo which is typically 2 to 10 cm less than the width Wc and the length Lc of the grid cell 122.

In the X and Y directions, neighboring grid cells are arranged in contact with each other such that there is no space there-between.

In a storage grid 104, a majority of the grid columns 112 are storage columns 105, i.e. grid columns where storage containers 106 are stored in stacks 107. However, a grid 104 normally has at least one grid column 112 which is not used for storing storage containers 106, but is arranged at a location wherein the container handling vehicles 3a can drop off and/or pick up storage containers 106 so that they can be transported to a second location (not shown) where the storage containers 106 can be accessed from outside of the grid 104 or transferred out of or into the grid 104. Within the art, such a location wherein the container handling vehicles 3a can drop off and/or pick up storage containers 106 is normally referred to as a "port" and the grid column at which the port is located may be referred to as a "delivery" or "transfer column" 119, 120. The drop-off and pick-up ports are the upper ends/openings of a respective delivery/transfer column 119, 120.

The prior art storage grids 104 in FIGS. 1(a) and 2(a) comprise two delivery columns 119 and 120. The delivery column 119 may for example comprise a dedicated drop-off port where the container handling vehicles 3a can drop off storage containers 106 to be transported through the delivery column 119 and further to e.g. a picking/stocking station, and the second delivery column 120 may comprise a dedicated pick-up port where the container handling vehicles 3a can pick up storage containers 106 that have been transported through the delivery column 120 from e.g. a picking/stocking station. Each of the ports of the first and second delivery column may be suitable for both pick-up and drop-off of storage containers.

The second location may typically be a picking/stocking station, wherein product items are removed from and/or positioned into the storage containers 106. In a picking/stocking station, the storage containers 106 are normally never removed from the automated storage and retrieval system 100, but are returned into the storage grid 104 once accessed.

For monitoring and controlling the automated storage and retrieval system 100, e.g. monitoring and controlling the location of respective storage containers 106 within the storage grid 104; the content of each storage container 106; and the movement of the container handling vehicles 3a so that a desired storage container 106 can be delivered to the desired location at the desired time without the container handling vehicles 3a colliding with each other, the automated storage and retrieval system 100 comprises a computerized control system (not shown) which typically comprises a database for keeping track of the storage containers 106.

A conveyor system comprising conveyor belts or rollers is commonly employed to transport the storage containers from a lower end of the delivery/transfer columns 119, 120 to e.g. a picking/stocking station.

A conveyor system may also be arranged to transfer storage containers between different storage grids, e.g. as is described in WO2014/075937A1, the contents of which are incorporated herein by reference.

Further, WO2016/198467A1, the contents of which are incorporated herein by reference, discloses an example of a prior art access system having conveyor belts (FIGS. 5a and 5b in WO2016/198467A1) and a frame mounted rail (FIGS. 6a and 6b in WO2016/198467A1) for transporting storage containers between delivery/transfer columns and stations where operators can access the storage containers.

When a storage container 106 stored in the storage grid 104 disclosed in FIG. 1(a) is to be accessed, one of the container handling vehicles 3a is instructed to retrieve the target storage container 106 from its position in the grid 104 and transport it to and/or through the delivery column 119. This operation involves moving the container handling vehicle 3a to a grid location above the storage column 105 in which the target storage container 106 is positioned, retrieving the storage container 106 from the storage column 105 using the container handling vehicle's lifting device (not shown), and transporting the storage container 106 to the delivery column 119. If the target storage container 106 is located deep within a stack 107, i.e. with one or a plurality of other storage containers positioned above the target storage container 106, the operation also involves temporarily moving the above-positioned storage containers prior to lifting the target storage container 106 from the storage column 105. This step, which is sometimes referred to as "digging" within the art, may be performed with the same container handling vehicle 3a that is subsequently used for transporting the target storage container 106 to the delivery column, or with one or a plurality of other cooperating container handling vehicles 3a. Alternatively, or in addition, the automated storage and retrieval system 100 may have container handling vehicles 3a specifically dedicated to the task of temporarily removing storage containers 106 from a storage column 105. Once the target storage container 106 has been removed from the storage column 105, the temporarily removed storage containers can be repositioned into the original storage column 105. However, the removed storage containers may alternatively be relocated to other storage columns 105.

When a storage container 106 is to be stored in the grid 104, one of the container handling vehicles 3a is instructed to pick up the storage container 106 from the delivery column 120 and to transport it to a grid location above the storage column 105 where it is to be stored. After any storage containers positioned at or above the target position within the storage column stack 107 have been removed, the container handling vehicle 3a positions the storage container 106 at the desired position. The removed storage containers may then be lowered back into the storage column 105, or relocated to other storage columns 105.

A problem related to prior art automated storage and retrieval systems is the utilization of storage facilities such as a warehouse for housing the automated storage and retrieval systems. The demand for larger sized automated storage and retrieval systems is increasing; a demand that may be challenged by the specific volumetric layout of certain warehouses when orienting the automated storage and retrieval systems in a suitable position to optimize the available storage space. The provision and working of the automated storage and retrieval systems limits the actual outlays and options when fitting the systems into the storage facility.

Each prior art automated storage and retrieval system has been arranged as a self-contained entity capable of storing and handling the storage containers, as well as delivery and retrieval of the storage containers. The vehicles handling the storage containers operate in the horizontal plane P on the top of the system, and to optimize the operation of the automated storage and retrieval system, the area of the horizontal plane and volume of the storage grid underneath the horizontal plane P are balanced to obtain an efficient working of the vehicles.

The housing of large scale automated storage and retrieval systems obviously demands a storage facility with a large volume and ideally a cubic or cuboid storage space offers the most suitable premises for optimizing the operation of the automated storage and retrieval system.

However, not all storing facilities display an efficient cubic or rectangular storage space. The housing may comprise spaces of different configurations and/or dimensions. The ceiling heights and/or floor level may for instance differ from one space to another, and the ceiling and/or floor may even be slanting.

Given these non-ideal premises, an optimized utilization of the available space is obtained with the prior art automated storage and retrieval systems being fitted into the space of the housing having the largest volume. Consequently, some of the smaller spaces may be left vacant and thus valuable storage space is wasted.

In order to optimize available storage space within a warehouse a prior art automated storage and retrieval systems introduces a container/bin lift for conveying a storage container from grids that are located at different vertical levels on top of each other and to a delivery station (see WO 2014/075937 A which is hereby incorporated by reference).

The operation of the prior art bin lift necessitates the presence of vehicles for delivering and receiving the bins for the transfer of storage containers to the delivery station and in between the grids. The solution is suitable for delivering and receiving storage containers to and from the delivery station and when using the bin lift for transferring storage in between grids. This prior art operation requires organizing available vehicles to be prepared for delivery and receiving the storage containers at their respective storage levels.

In view of the above, it is desirable to provide system for storing and transporting storage containers and a method for operating such a system, that solves or at least mitigates one or more of the aforementioned problems related to the use of prior art storage and retrieval systems allowing storage containers to be transported.

An object of the present invention is to optimize available storage space within a warehouse which may comprise spaces having different configurations and/or dimensions, such as e.g. several floor levels and/or may comprise a third-party storage, production and distribution system such as a plurality of automated storage and retrieval grids which are horizontally or horizontally and vertically displaced.

SUMMARY OF THE INVENTION

The present invention is set forth and characterized in the independent claims, while the dependent claims describe other optional characteristics of the invention.

In particular, the invention concerns a system for storing and transporting storage containers which comprises an automated storage and retrieval grid, a delivery system and a vehicle lift device.

The automated storage and retrieval grid comprises vertical members defining multiple storage columns for storing storage containers on top of each other in vertical stacks. The vertical members are interconnected at their upper ends by a container handling vehicle rail system arranged to guide at least one container handling vehicle. The container handling vehicle is configured to raise storage containers from, and lower storage containers into the storage columns, and to transport the storage containers above the storage columns.

The container handling vehicle rail system is arranged in a first horizontal plane and comprises a first set of parallel rails extending in a first direction X, and a second set of parallel rails and extending in a second direction Y which is orthogonal to the first direction X. The first and second sets of rails form a grid pattern in the first horizontal plane comprising a plurality of adjacent container handling vehicle grid cells. Each container handling vehicle grid cell comprises a container handling vehicle grid opening defined by a pair of neighboring rails of the first set of rails and a pair of neighboring rails of the second set of rails. Further, the automated storage and retrieval grid comprises a transfer column adapted for transport of a storage container between the container handling vehicle and a delivery space situated at a lower end of the transfer column.

The container handling vehicles may be as shown in the background section having a footprint, i.e. an extent in the X and Y directions, which is generally larger or equal to the horizontal area of a grid cell.

The delivery system comprises a first delivery rail system having at least one set of parallel rails arranged in a second horizontal plane guiding at least one delivery vehicle thereon. The delivery vehicle is adapted to receive and/or deliver a storage container at a storage container delivery location arranged below the delivery space of the transfer column and to move between the storage container delivery location and a second location. The first delivery rail system covers at least an area extending from the storage container delivery location to the second location.

The delivery rail system, on which the delivery vehicles operate may be arranged in a grid pattern in the same way as the rail system of the container handling vehicles. The delivery rail system may extend across the lower level of the storage grid, covering at least one, preferably all, of the storage container delivery locations, as well as the distance from the storage grid to the second location.

The first delivery rail system may be dual-track rails, such that the delivery vehicles may pass each other upon adjacent grid cells of the first delivery rail system when moving in the one direction. In other words, the rails of the first delivery rail system may extend in two perpendicular horizontal directions, and at least one of the rails extending in one of the two perpendicular directions of the first delivery rail system may be dual-track rails, such that the delivery vehicles may pass each other upon adjacent grid cells of the first delivery rail system when moving in the one direction.

Each grid cell of the delivery rail system may have a size which is equal or similar to the size of the grid cells of the container handling vehicle rail system for the container handling vehicles. In addition to facilitate production and ensure costs by allowing use of already designed and tested components, the required alignment of the delivery vehicle below the upper rail system for the container handling vehicle becomes easier to achieve.

A typical width of each grid cell of the delivery rail system is within the interval of 30 to 150 cm, and a typical length is within the interval of 50 to 200 cm.

The widths and the lengths of each grid opening are typically 2 to 10 cm less than the widths and the lengths of the corresponding grid cell (FIG. 3 (c)).

Since the delivery vehicle can be operating directly under the container handling vehicles on top of the storage grid, its dimensions may naturally correspond to the grid cell size of the storage grid above. Many of the same considerations as for the container handling vehicles apply, for example the ability for the vehicles to pass each other on adjacent grid cells. But for the delivery vehicle the single grid space configuration also has other advantages such as to avoid interference with upright members of the storage grid.

The delivery vehicle may be a remotely operated delivery vehicle comprising
  rolling devices being configured to move the delivery vehicle on the first delivery rail system,
  rolling device motors for driving the rolling devices, and
  a power source configured to provide propulsion power to the rolling device motors.

The rolling devices of the delivery vehicle may be driving belts or wheels.

In one embodiment the delivery vehicle may comprises eight wheels, wherein a first set of four wheels enable the lateral movement of the delivery vehicle in a first direction and a second set of the remaining four wheels enable the lateral movement in a second direction being perpendicular to the first direction. One or both sets of wheels in the wheel arrangement is connected to a wheel lifting mechanism and can be lifted and lowered, so that the first set of wheels and/or the second set of wheels can be engaged with the respective set of rails of the delivery rail system at any one time.

In one embodiment the delivery vehicle may comprise a weighing mechanism to measure the weight of the storage container, for example a commercially available electronic weighing scale. Such a weighing mechanism may provide information concerning the content inside each storage container such as the total weight, the number of units, the internal weight distribution and/or the location within the automated storage and retrieval grid the storage container should be placed.

The vehicle lift device is arranged to transfer at least one delivery vehicle between the second location and a third location arranged in a third horizontal plane being at a different vertical level than the second horizontal plane.

The third location arranged in the third horizontal plane may be arranged apart from/external to the automated storage and retrieval system; i.e. when the delivery vehicle is arranged on the third location it cannot deliver or receive storage containers to or from the automated storage and retrieval system. To deliver or receive storage containers to or from the automated storage and retrieval system, the delivery vehicle must be arranged below a transfer column.

In one embodiment the the third location comprises an interface connected to a third-party storage, production and distribution system.

Such a third-party storage, production and distribution system may be another delivery rail system being different from the delivery system comprising the first delivery rail system, or it may be a production facility, an assembling facility, a reception, a shipping location, etc.

If the third location comprises an interface connectable to a third-party storage, production and distribution system, such as another delivery system transferring bins to and from another automated storage and retrieval system, the third location will be integrable with other delivery system system such that storage containers can be transported between the third location and the delivery system of the third-party storage, production and distribution system.

If the third horizontal plane which includes the third location comprises a delivery rail system as disclosed for the second horizontal plane, the delivery rail system of the third horizontal plane may comprise an interface connectable to a third-party storage, production and distribution system, such as another delivery system transferring bins to and from another automated storage and retrieval system. In such a case the delivery rail system of the third horizontal plane may be integrable with the third-party storage, production and distribution system such that storage containers can be transported between the delivery rail system of the third horizontal plane and the delivery system of the third-party storage, production and distribution system.

In another embodiment the third location and/or delivery rail system of the third horizontal plane may be connectable to a third-party storage, production and distribution system such as a production facility, assembling facility, reception or shipping location, etc. The connection may be by means of a connectable rail system or a conveyor system comprising conveyors employed to transport the storage containers between the delivery rail system of the third horizontal plane and the third-party storage, production and distribution system.

The vehicle lift device may have a lifting arrangement arranged to support the at least one delivery vehicle and a lift mechanism for moving the lifting arrangement between a first lift stop position to a second lift stop position.

The first lift stop position establishes access between the lifting arrangement and the second location for enabling relocation of the at least one delivery vehicle between a support position on the lifting arrangement and an operative position at the second location on the first delivery rail system, and the second lift stop position establishes access between the lifting arrangement and the third location for enabling relocation of the at least one delivery vehicle between the support position on the lifting arrangement and an operative position at the third location.

The second location arranged on the delivery rail system may be arranged outside the automated storage and retrieval grid such as outside an area defined by the vertical projection of the automated storage and retrieval grid. The part of the delivery rail system comprising the second location may be at least equal to the area of one grid cell of the delivery rail system to enable the vehicle lift device to lift the delivery vehicle in an upwards vertical direction.

The lift mechanism may be configured to move the lifting arrangement in a substantially vertical or purely vertical direction between the first lift stop position and the second lift stop position.

However, if the first lift stop position is spaced so far away from the second lift stop position in the horizontal direction that a substantially vertical displacement of the lifting arrangement is not possible, the vertical lift device may have an inclined orientation i.e. have a substantial horizontal component, depending on the horizontal gap between the first and second lift stop position. The lifting arrangement would then make an inclined moving path covering the vertical and horizontal gap between the first and second lift stop position.

Further, the lifting arrangement may comprise a guiding and positioning structure for maintaining the at least one vehicle in a motionless or near motionless position on the lifting arrangement during transfer of the lifting arrangement between the first and second lift stop position.

The guiding and positioning structure may comprise a platform rail arrangement having at least a first set of parallel rails for placing the vehicle during transfer between the first and second lift stop position.

The platform rail arrangement may be level with the first delivery rail system when the lifting arrangement is placed in the first lift stop position thereby enabling the at least one delivery vehicle to move between the first delivery rail system and the platform rail arrangement, and the platform rail arrangement may be level with a second delivery rail system at the third location when the lifting arrangement is placed in the second lift stop position thereby enabling the at least one delivery vehicle to move between the second delivery rail system and the platform rail arrangement.

Thus, the first set of parallel rails of the platform rail arrangement may be compatible with and co-operate with the rails of the first delivery rail system such that the platform rail arrangement can be seen as an extension of the corresponding first set of parallel rails of the first delivery rail system when the platform rail arrangement is positioned in the first lift stop position. Then the at least one delivery vehicle having wheels engaged with the rails of the first delivery rail system can easily move on to the first set of parallel rails of the platform rail arrangement.

The first delivery rail system may comprise at least a first set of parallel rails extending in a third direction X' and at least a second set of parallel rails extending in a fourth direction Y' which is orthogonal with the third direction X'. Further, the platform rail arrangement may comprise the at least one first set of parallel rails extending in the same third direction X' and at least a second set of parallel rails extending in the same fourth direction Y'. The platform rail arrangement may then be compatible with the first delivery rail system such that the delivery vehicle can to or from the support position of the platform rail arrangement in the third and/or fourth direction.

Further, the horizontal extent/foot print of the platform rail arrangement may be equal to or larger than the horizontal extent/foot print of the at least one delivery vehicle to be transferred between the first lift stop position and the second lift stop position. If the horizontal extent of the platform rail arrangement is larger than the horizontal extent of the at least one delivery vehicle, it may extent further in either the third direction X', fourth direction Y' or in both third and fourth directions.

The platform rail arrangement may comprise multiple first and/or second sets of parallel rails allowing more than one delivery vehicle to be arranged on the platform rail arrangement.

In another exemplary embodiment, the guiding and positioning structure comprises a base plate structure for receiving the at least one delivery vehicle.

The lifting arrangement, especially if it is a base plate structure may further comprise at least two side walls for receiving the at least one delivery vehicle in the area defined by the at least two side walls and the guiding and positioning structure, to protect the delivery vehicle from moving off the support position during transportation between the first and second lift stop position.

The side walls may project vertically upwards from the base plate structure for maintaining the delivery vehicle in a motionless or near motionless position during transportation on the lifting arrangement. The delivery vehicle may be held securely on the vehicle lift device during its transport thereon.

The number of side walls may be chosen dependent on the specific need for support during transport, and may in one aspect comprise three side walls.

The side wall may be adjusted between an open and closed position for letting the vehicle on and off the lifting arrangement.

Further, the lift device may have a first safety barrier configured to restrict further horizontal movement of the at least one delivery vehicle when the at least one delivery vehicle is moving to or from the support position. The first safety barrier may be in the form of a safety loop preventing the vehicle from moving off the platform. Further, it may be arranged on the lift device at the highest lift stop position.

The vehicle lift device may further comprises a second safety barrier extending vertically for restricting horizontal displacement of the at least one delivery vehicle when the platform is moving between the first lift stop position and the second lift stop position. Thus, the second safety barrier may extend vertically from the first lift stop position to the second lift stop position.

The system may comprise a plurality of vehicle lift devices for transferring delivery vehicles between the second and third horizontal plane.

As mentioned above the third location may be a part of the second delivery rail system. The second delivery rail system may comprise at least one set of parallel rails arranged in the third horizontal plane for guiding at least one delivery vehicle thereon. The second delivery rail system may extend from the third location to a fourth location.

Thus, the first set of parallel rails of the platform rail arrangement of the guiding and positioning structure of the lifting arrangement can be compatible with the rails of the second delivery rail system such that the platform rail arrangement can be seen as an extension of the corresponding set of parallel rails of the second delivery rail system when the platform rail arrangement is positioned in the second lift stop position. Then the at least one delivery vehicle having wheels engaged with the rails of the platform rail arrangement can easily move on to the set of parallel rails of the second delivery rail system.

The second delivery rail system may comprise a first set of parallel rails arranged in the third horizontal plane and extending in a fifth direction X", and a second set of parallel rails arranged in the third horizontal plane and extending in a sixth direction Y" which is orthogonal to the fifth direction X", which first and second sets of rails form a grid pattern.

The third direction X' of first set of parallel rails of the first delivery rail system may be the same as the fifth direction X" of the first set of parallel rails of the second delivery rail system.

The second delivery rail system may be an overpass rail system which may be in connection with a second vehicle lift device, or it may be a delivery rail system for a second storage grid, or it may be parking rail system for storing the delivery vehicle, or it may be an access rail system being in connection with at least one access station where the storage container can be accessed by a user or a robot.

Further, the first horizontal plane may be at the same level as the third horizontal plane.

The system may further comprise a second vehicle lift device for transfer of the at least one delivery vehicle between the fourth location on the second delivery rail system and a fifth location arranged in a fourth horizontal plane being at a different vertical level than the third horizontal plane.

The fourth horizontal plane may be at the same vertical level as the second horizontal plane.

The container handling vehicle rail system, the first and second delivery vehicle rail system and the platform arrangement may have a single rail system or a double rail system.

The delivery vehicle is as mentioned adapted to receive and/or deliver a storage container at a storage container delivery location and may comprises a storage container carrier provided above a chassis of the delivery vehicle for carrying the storage container in place above the delivery vehicle during transport.

The storage container carrier may be directly connected to the chassis of the delivery vehicle or it may be connected to said chassis via a structure. The structure may be able by turn and/or tilt the storage container.

The present invention further involves a building comprising said system mentioned above where the second and third horizontal planes represent floors at different levels within the building.

The present invention also involves a method of operating said system for storing and transporting storage containers where the system comprises the automated storage and retrieval grid having vertical members defining multiple storage columns for storing storage containers on top of each other in vertical stacks, wherein the vertical members are interconnected at their upper ends by the container handling vehicle rail system arranged to guide the at least one container handling vehicle being configured to raise storage containers from, and lower storage containers into, the storage columns, and to transport the storage containers above the storage columns, wherein the container handling vehicle rail system comprises the first set of parallel rail arranged in a first horizontal plane and extending in the first direction X, and the second set of parallel rails arranged in the first horizontal plane and extending in the second direction Y which is orthogonal to the first direction X, which first and second sets of rails form a grid pattern in the first horizontal plane comprising a plurality of adjacent container handling vehicle grid cells, each container handling vehicle grid cell comprising the container handling vehicle grid opening defined by a pair of neighboring rails of the first set of rails and a pair of neighboring rails of the second set of rails, the transfer column adapted for transport of a storage container between the container handling vehicle and a delivery space situated at the lower end of the transfer column;

the delivery system comprising a first delivery rail system having at least one set of parallel rails arranged in a second horizontal plane guiding at least one delivery vehicle thereon, wherein the delivery vehicle is adapted to receive or deliver a storage container at the storage container delivery location arranged below the delivery space of the transfer column and to move between the storage container delivery location and a second location, the first delivery rail system is at least covering an area extending from the storage container delivery location to the second location, the vehicle lift device for transfer of the at least one delivery vehicle between the second location and a third location arranged in a third horizontal plane being at a different vertical level than the second horizontal plane.

The method comprises the steps of:

i) moving the delivery vehicle from the second location to a first lift position of the vehicle lift device, ii) moving the delivery vehicle to a second lift stop position of the vehicle lift device enabling access between the vehicle lift device and the third location, and iii) moving the delivery vehicle to the third location.

The delivery vehicle may move onto the first lift stop position of the vehicle lift device in one direction and move from the second lift stop position of the vehicle lift device on to the third location in the opposite direction.

However, if the first and the second lift stop positions are at least partly overlapping in the horizontal plane, the delivery vehicle may move onto the first lift stop position and off from the second lift stop position in the same direction.

As mentioned, the vehicle lift device may comprise a lifting arrangement arranged to support the at least one delivery vehicle and a lift mechanism arranged to move the lifting arrangement between the first lift stop position and the second lift stop position. The first lift stop position may establish access between the lifting arrangement and the second location for enabling relocation of the at least one delivery vehicle between a support position on the lifting arrangement and an operative position on the second location on the first delivery rail system, and the second lift stop position may establish access between the lifting arrangement and the third location for enabling relocation of the at least one delivery vehicle between the support position on the lifting arrangement and an operative position on the third location.

Thus, steps i) to iii) above may involve:

i) moving the delivery vehicle from the second location on to the lifting arrangement placed at in the first lift position of the vehicle lift device, ii) moving the lifting arrangement with the delivery vehicle to the second lift stop position of the vehicle lift device enabling access between the lifting arrangement and the third location, and iii) moving the delivery vehicle to the third location.

Prior to step i) above the method may comprise the steps of:

a) moving the container handling vehicle to a location on the container handling vehicle rail system for transferring a storage container into the transfer column, b) moving the delivery vehicle to the storage container delivery location, c) transferring the storage container from the container handling vehicle through the transfer column to the delivery space and on to the delivery vehicle, d) moving the delivery vehicle from the storage container delivery location to the second location to thereby move the storage container.

After step iii) the method may comprise the step of iv) moving the delivery vehicle to an access area for handling the storage container by a robotic operator and/or a human operator.

The invention may provide a storage and retrieval system comprising a plurality of separated automated storage and retrieval grids each substantially as described herein, which grids are interconnected by at least one delivery system as described herein and at least one vehicle lift device as described herein so that storage containers may be transported between the grids by use of delivery vehicles and the at least one vehicle lift device.

The invention may provide a method of transporting a storage container to a predetermined location using a system as described herein by lifting a delivery vehicle carrying the storage container. The invention may provide a method of transferring storage containers between automated storage and retrieval grids as described herein by lifting a delivery vehicle carrying the storage container. The delivery vehicle may carry the storage container above itself

BRIEF DESCRIPTION OF THE DRAWINGS

Following drawings are appended to facilitate the understanding of the invention.

In the drawings, like reference numerals have been used to indicate like parts, elements or features unless otherwise explicitly stated or implicitly understood from the context.

DETAILED DESCRIPTION OF THE INVENTION

Figure 1:
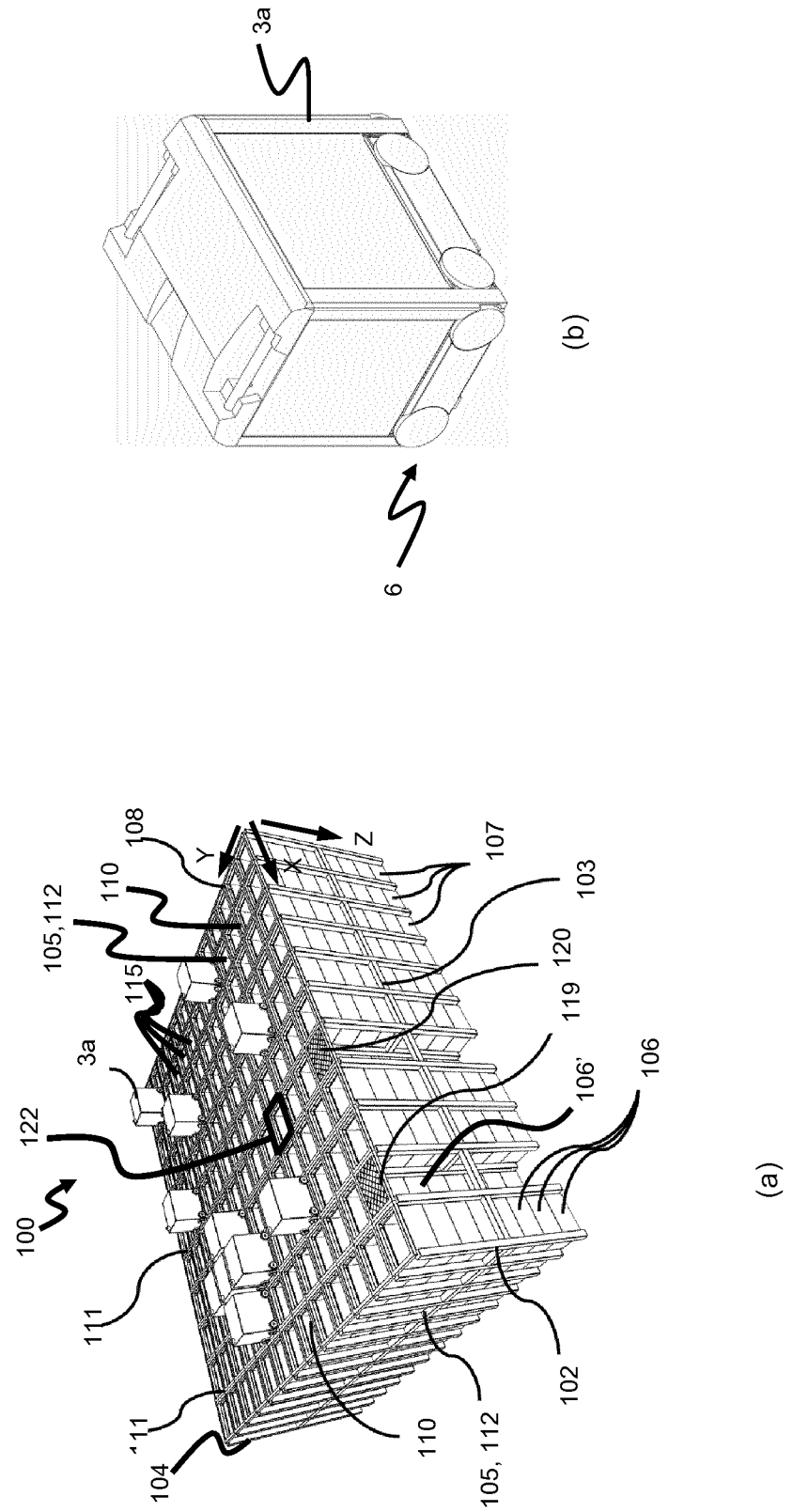
FIG. 1a is a perspective view of a grid of a prior art automated storage and retrieval system.
FIG. 1b is a perspective view of a prior art storage container handling vehicle.

In the following, embodiments of the invention will be discussed in more detail with reference to the appended drawings. It should be understood, however, that the drawings are not intended to limit the invention to the subject-matter depicted in the drawings.

Exemplary embodiments of the system according to the present invention are shown in FIGS. 5 to 12.

Figure 2:
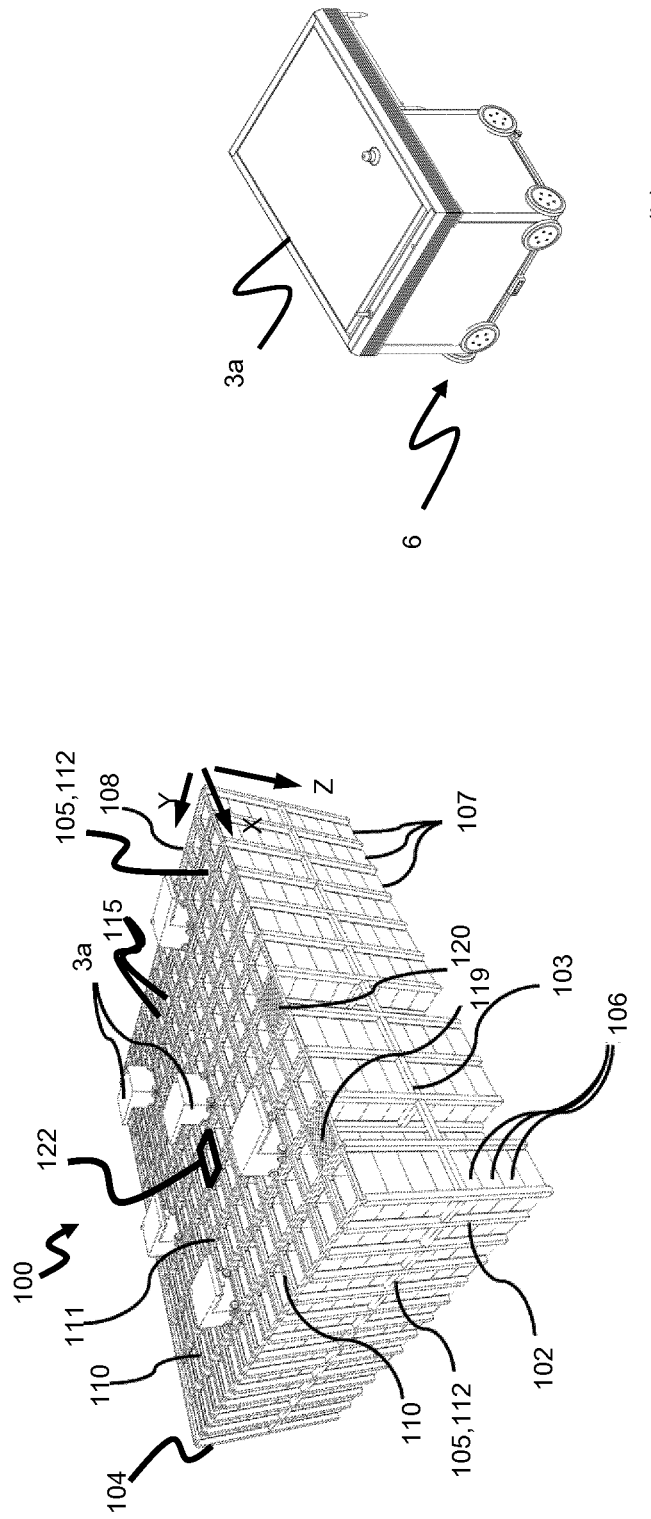
FIG. 2a is a perspective view of a grid of a prior art automated storage and retrieval system.
FIG. 2b is a perspective view of a prior art storage container handling vehicle.
Figure 3:
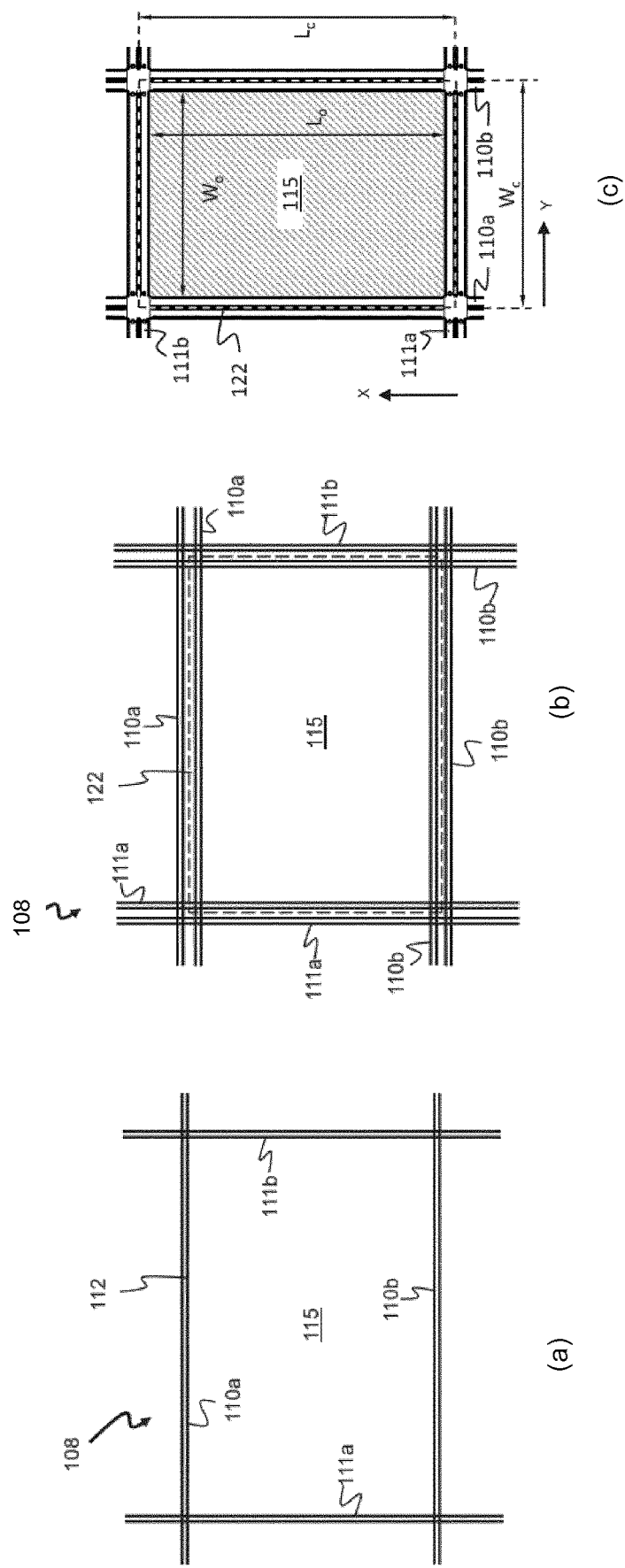
FIG. 3a is a top view of a prior art single rail grid.
FIG. 3b is a top view of a prior art double rail grid.
FIG. 3c is an illustration of the width and length of a grid cell.

FIGS. 1 to 3 have already been described in the background section.

Figure 4:
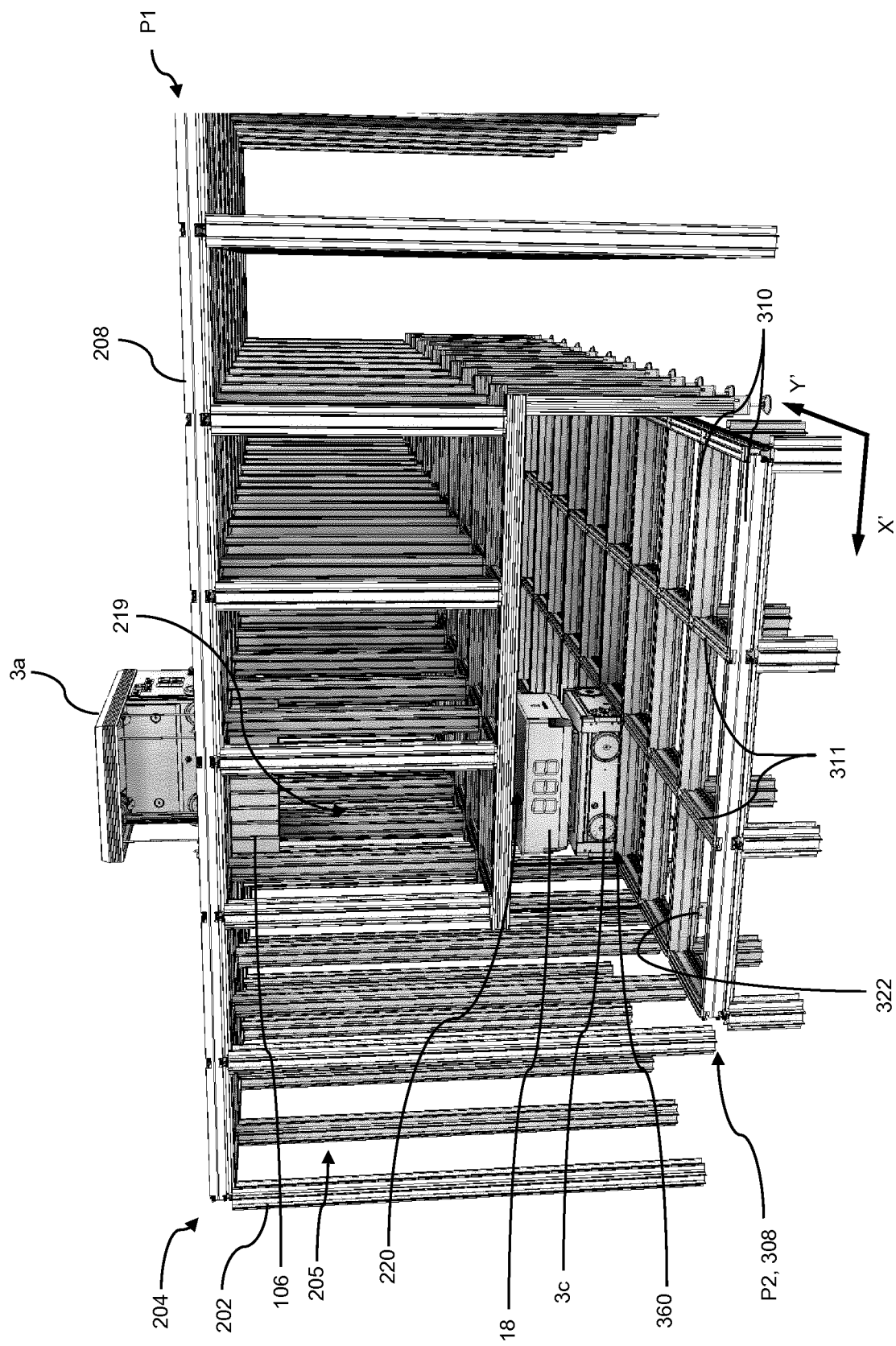
FIG. 4 shows a perspective view of an exemplary automated storage and retrieval grid and a delivery vehicle system.

FIG. 4 shows an automated storage and retrieval grid 204. The automated storage and retrieval grid 204 has a plurality of vertical members/column profiles 202 defining multiple storage columns 205 for storing storage containers 106 in vertical stacks (not shown). The vertical members 202 are interconnected at their upper ends by top rails forming a container handling vehicle rail system 208. The container handling vehicle rail system 208 comprises a first set of parallel rails 210 arranged in a first horizontal plane P1 and extending in a first direction X, and a second set of parallel rails 211 arranged in the first horizontal plane P1 and extending in a second direction Y which is orthogonal to the first direction X. The first and second sets of rails 210, 211 form a grid pattern in the first horizontal plane P1 comprising a plurality of adjacent container handling vehicle grid cells 222, each container handling vehicle grid cell 222 comprising a container handling vehicle grid opening 215 defined by a pair of neighboring rails 210a, 210b of the first set of rails 210 and a pair of neighboring rails 211a, 211b of the second set of rails 211. See also FIG. 12 for details.

A storage container handling vehicle 3a is shown on top of the container handling vehicle rail system 208 arranged in a first horizontal plane P1. The storage container handling vehicle 3a is shown lowering a storage container 106 into a transfer column 219 for transferring the storage container 106 to the delivery space 220 situated at the lower end of the transfer column 219. A delivery vehicle 3c having a storage container carrier 18 on top of its chassis is arranged at a storage container delivery location 360 situated below the delivery space 220. The storage container carrier 18 can receive the storage container 106 from the storage container handling vehicle 3a.

The first delivery rail system 308 is arranged at a level below the container handling vehicle rail system 208 and the delivery vehicle 3c is arranged on top of the first delivery rail system 308. The first delivery rail system 308 has a plurality of first sets of parallel rails 310 arranged in a second horizontal plane P2 extending in a third direction X' and a plurality of second sets of parallel rails 311 extending in the fourth direction Y' which is orthogonal to the third direction X'. As can be seen, the first and second sets of rails of the first delivery rail system form a grid pattern.

A plurality of container handling vehicles 3a may be arranged on top of the container handling vehicle rail system 208, and a plurality of delivery vehicles can be arranged on the first delivery rail system 308. Further, the storage grid 204 has a plurality of transfer columns 219 such that the plurality of storage container handling vehicles 3a can transfer storage containers 106 to and from the delivery vehicles 3c arranged on the first delivery rail system 308.

The figure also illustrates the first delivery rail system 308 having a horizontal area/projection extending from below the transfer columns 219 to an external side of the storage grid 204.

Figure 5:
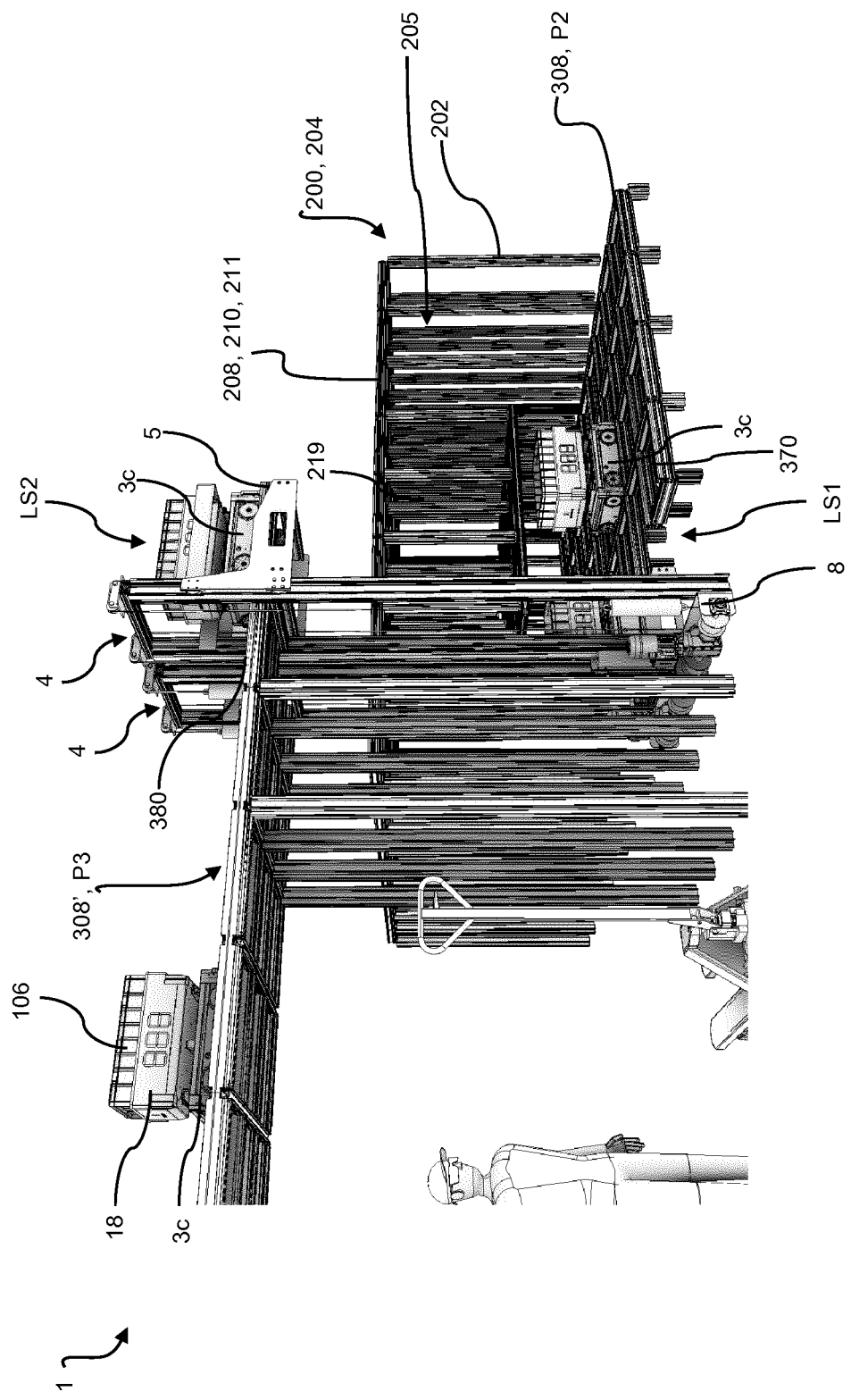
FIG. 5 is a perspective view of a system according to an exemplary embodiment of the present invention with a vehicle lift device in the second lift stop position.

FIG. 5 illustrates the automated storage and retrieval grid 204 and the delivery rail system 308 in FIG. 4. Further, FIG. 5 illustrates two vehicle lift devices 4 in a side-by-side arrangement for transferring delivery vehicles 3c between the second and third horizontal plane (P2, P3). As can be seen, a second delivery rail system 308' is arranged in a third horizontal plane P3 having a delivery vehicle 3c arranged thereon. For simplicity only one of the two vehicle lifting devices 4 will be referred to in the following disclosure of FIG. 5. The other vehicle lifting device may be substantially the same as the one described.

The first and second delivery rail systems 308, 308' are positioned so that a part of an outer perimeter of the first delivery rail system 308 is neighboring or is adjacent to at least a part of an outer circumference of the second delivery rail system 308' when viewed from above. The horizontal distance between the outer perimeter of the first delivery rail system 308 which is neighboring the outer perimeter of the second delivery rail system 308' is shown to be the size of one grid cell.

Since the delivery vehicle 3c that moves on the first delivery rail system 308 may be the same delivery vehicle 3c that moves on the second delivery rail system 308' the size/area of the grid cells are the same for both the first and second delivery rail system 308, 308'.

The vehicle lift device 4 is positioned in the space between the first and second delivery rail systems 308, 308' but may also be located in a shaft (not shown) of for example the first delivery rail system 308. If a vehicle lift device 4 is located in a shaft, the first and second delivery rail system 308, 308' can be positioned so that a part of the outer perimeter of the first delivery rail system 308 coincides (when viewed from above) with at least a part of the outer perimeter of the second delivery rail system 308'.

The lifting device 4 has a lift mechanism 8 arranged to move a lifting arrangement 5 between the first lift stop position LS1, establishing access between the lifting arrangement 5 and the second location 370 of the first delivery rail system 308, and the second lift stop position LS2, establishing access between the lifting arrangement 5 and the third location 380 of the second delivery rail system 308'.

In FIG. 5 the lifting arrangement 5 is arranged in the second lift stop position LS2 enabling the vehicle to move from the lifting arrangement on to the second delivery rail system 308'.

As can be seen, the system 1 may comprise a plurality of vehicle lift devices 4. The vehicle lift devices 4 can be arranged next to each other as shown in FIG. 5, but may be arranged at any position within the system 1 allowing the vehicle lift device 4 to transfer a delivery vehicle 3c between the first and second delivery rail systems 308, 308'.

Figure 11:
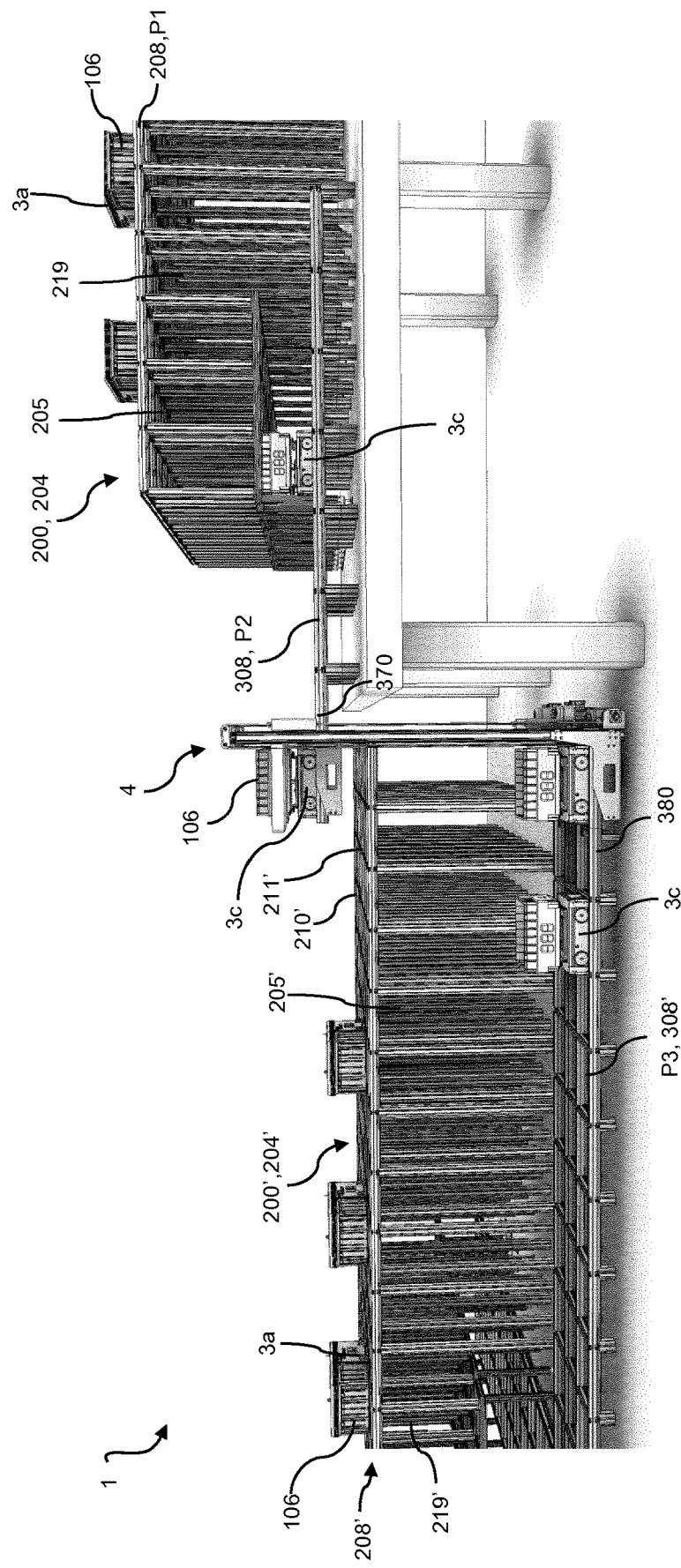
FIG. 11 shows a perspective view of a system according to an exemplary embodiment of the present invention involving a first storage and retrieval grid having a first delivery rail system extending from below the first storage and retrieval grid to a second location and a second storage and retrieval grid having a second delivery rail system extending from below the second storage and retrieval grid to a third location, and a vehicle lift device transferring a delivery vehicle between the second and the third locations.
Figure 12:
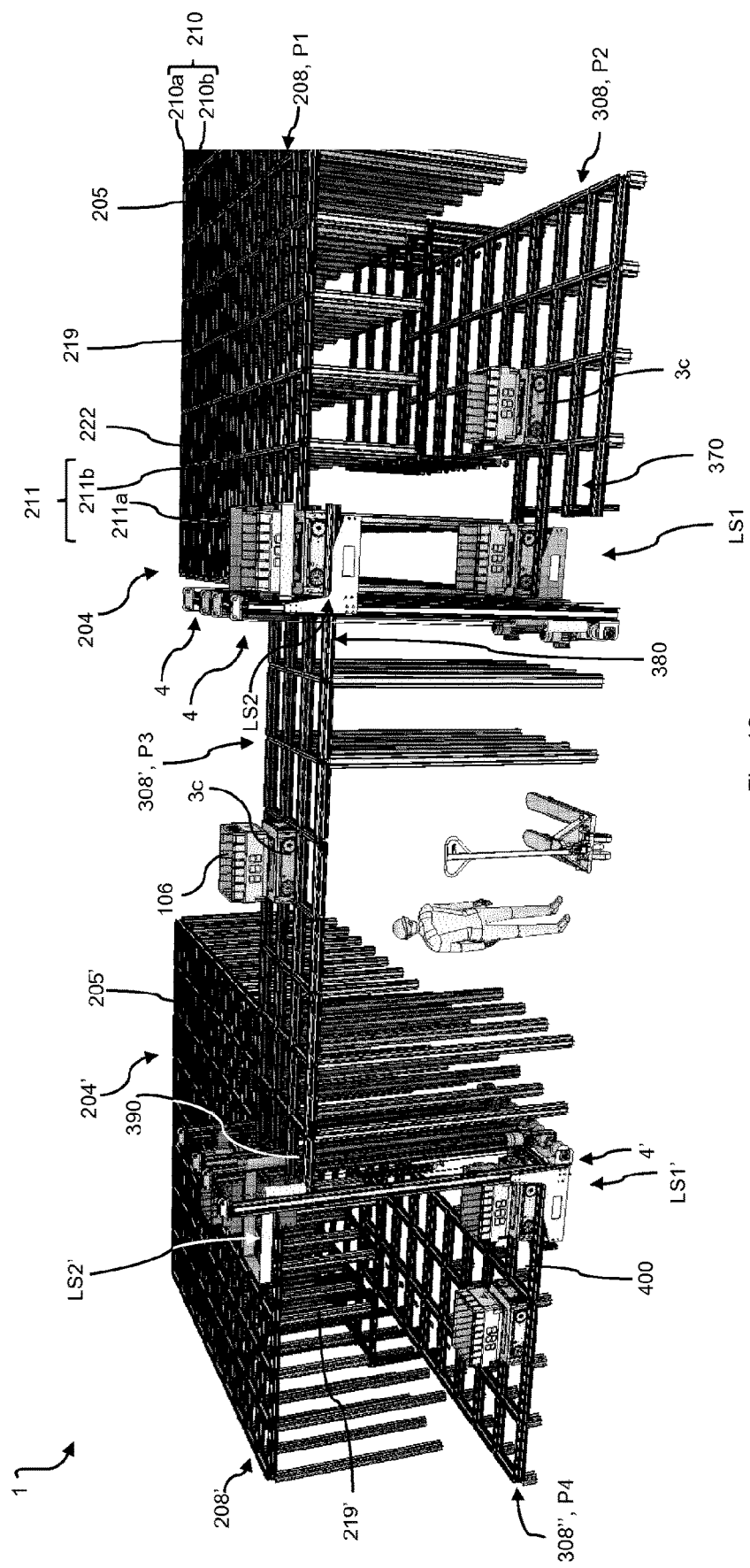
FIG. 12 shows a perspective view of a system according to an exemplary embodiment of the present invention involving a first storage and retrieval grid having a first delivery rail system extending from below the first storage and retrieval grid to a second location, and a second storage and retrieval grid having a second delivery rail system extending from below the second storage and retrieval grid to a third location, and an overpass rail, and two vehicle lift devices transferring a delivery vehicle between the first and second delivery vehicle rail systems.

The second delivery rail system 308' can be arranged such that the delivery vehicle 3c can move to for example a production facility or a picking/stocking station where the storage container 106 can be accessed, or it can be arranged at a level below a second automated storage and retrieval grid 204' as shown in FIG. 11, or it can be arranged between a first and a second automated storage and retrieval grid 204, 204' functioning as a bridge there between as shown in FIG. 12.

The second automated storage and retrieval grid 201' may have the same configuration as the first automated storage and retrieval grid 204.

Figure 6:
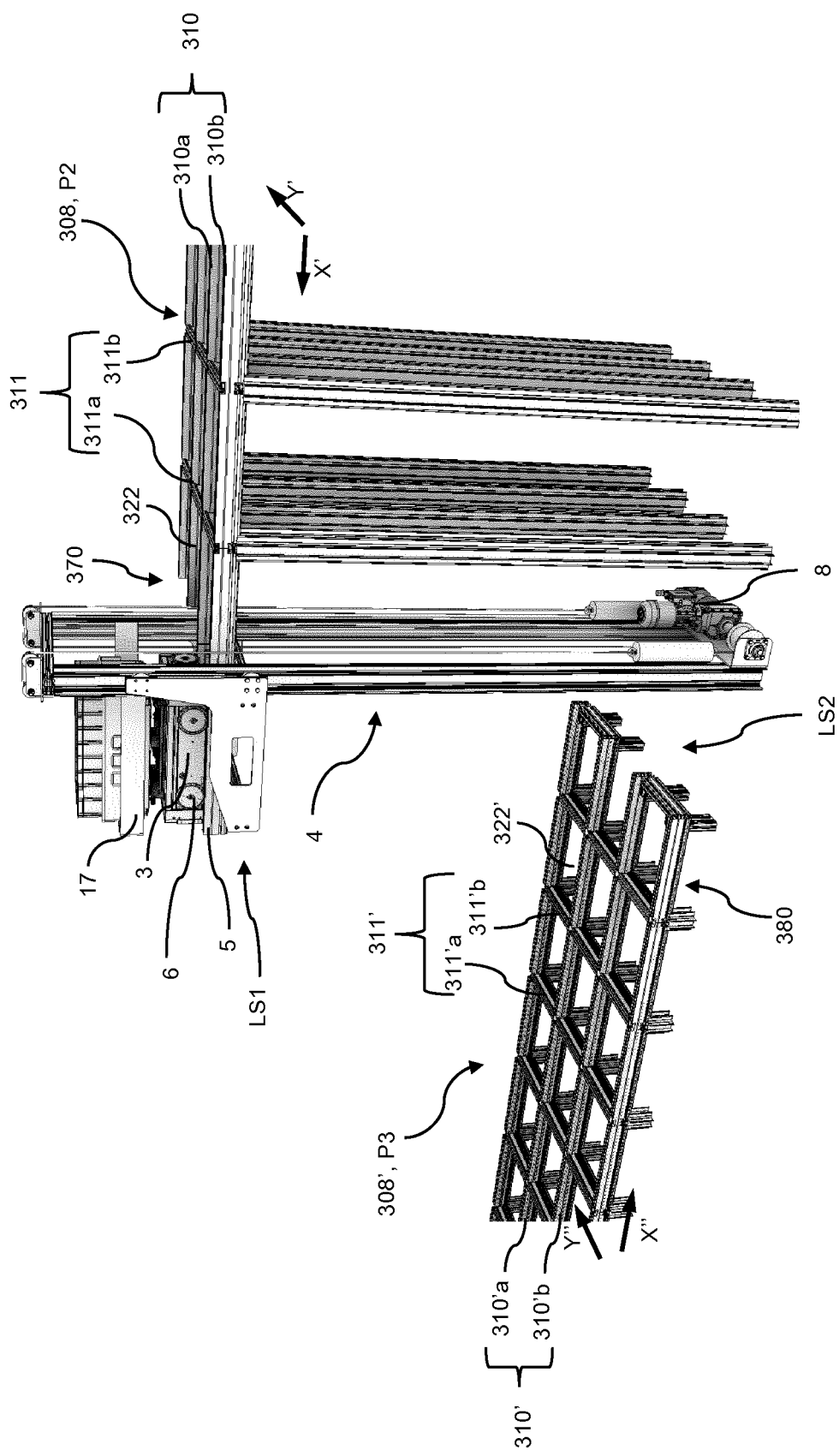
FIG. 6 is a perspective view of a system according to an exemplary embodiment of the present invention with a vehicle lift device in the first lift stop position.
Figure 7:
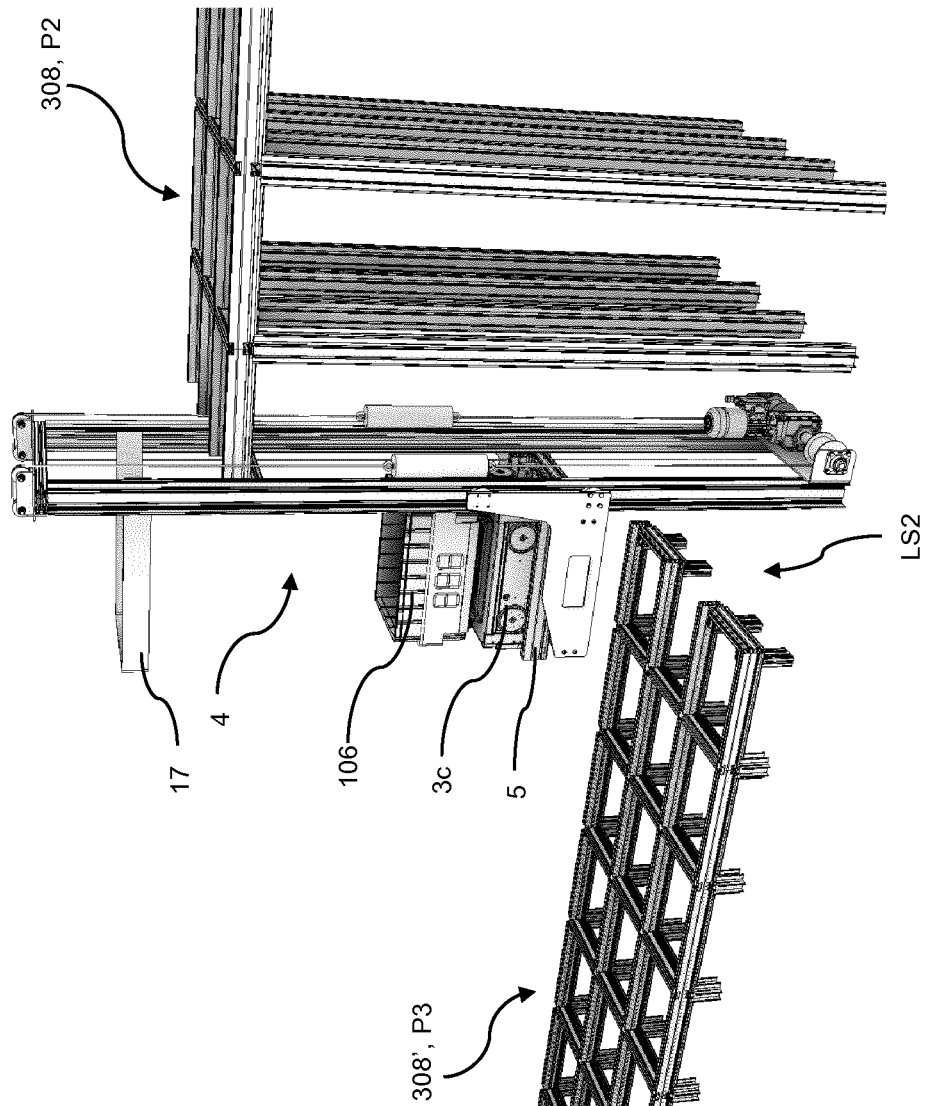
FIG. 7 is a perspective view of a system according to an exemplary embodiment of the present invention with a vehicle lift device in between the first and second lift stop position.
Figure 8:
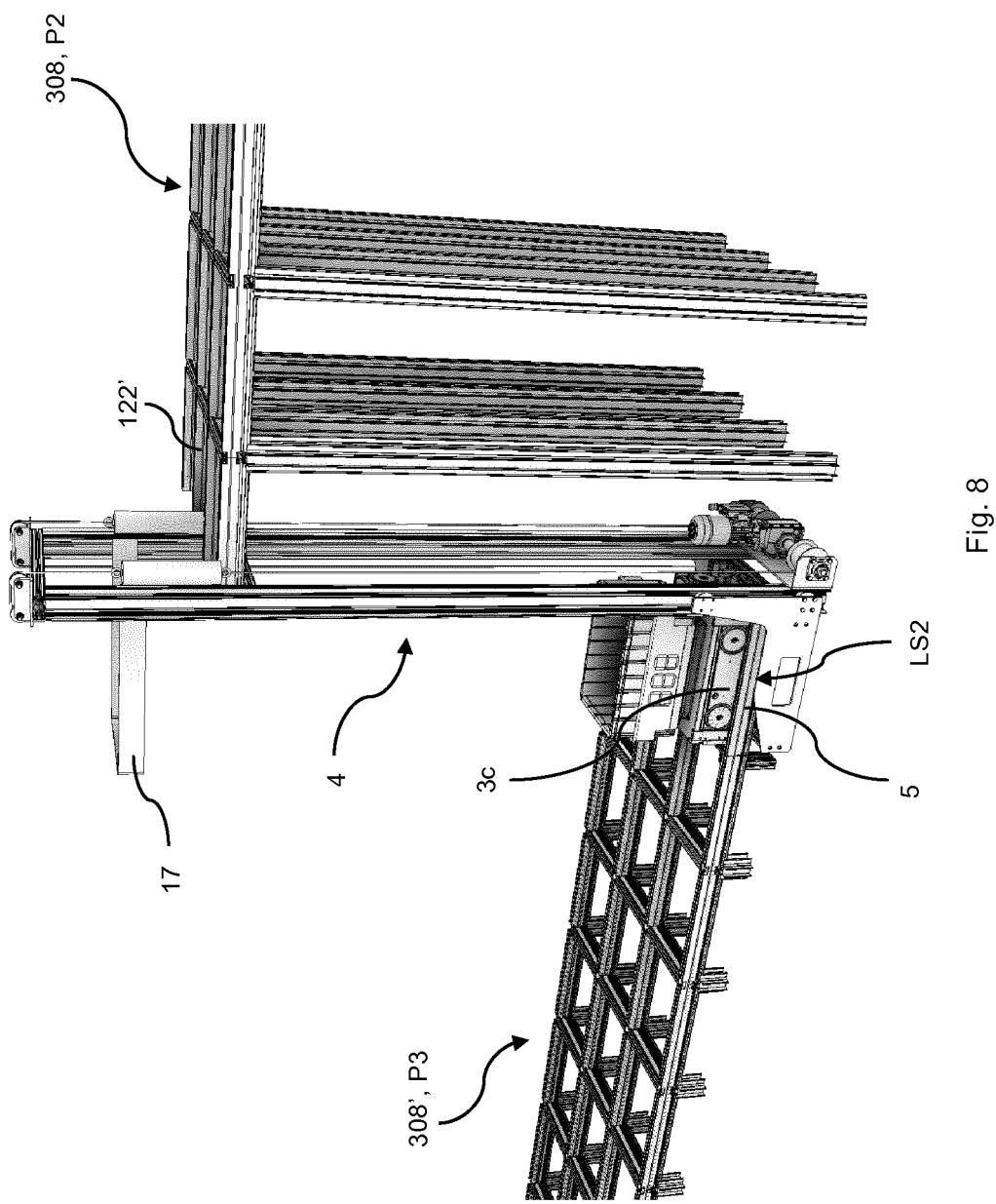
FIG. 8 is a side view of a system according to an exemplary embodiment of the present invention with the vehicle lift device in the second lift stop position.

FIGS. 6 to 8 illustrate, similar to FIG. 5, a first and second delivery rail system 308, 308' having a vehicle lift devices 4 positioned in the space/position between the first and second delivery rail systems 308, 308'. FIGS. 6 to 8 is a close-up view of the vehicle lift device 4 not showing the first automated storage and retrieval grid in FIGS. 4 and 5. Further, the first delivery rail system 308 in FIGS. 6 to 8 is arranged in the second horizontal plane P2 which is in a higher vertical level than the second delivery rail system 308' arranged in the third horizontal plane P3.

The first delivery rail system 308 has a first set of parallel rails 310 extending in a third direction X', and a second set of parallel rails 311 extending in the fourth direction Y' which is orthogonal to the third direction X'.

The second delivery rail system 308' has a first set of third set of parallel rails 310' extending in the fifth direction X" and a second set of parallel rails 111" extending in a sixth direction Y" which is orthogonal to the fifth direction X". The grid pattern of the first and second delivery rail system 308, 308' comprises a plurality of adjacent grid cells 322, 322'. Each grid cell 322 of the first delivery rail system 308 is defined by a pair of neighboring rails 310a, 310b of the first set of rails 310 and a pair of neighboring rails 311a, 311b of the second set of rails 311, while each grid cell 322' of the second delivery rail system 308' is defined by a pair of neighboring rails 310'a, 310'b of the first set of rails 310' of the second delivery rail system 308' and a pair of neighboring rails 311'a, 311'b of the second set of rails 311'.

FIG. 6 illustrates the lifting arrangement 5 of vehicle lift device 4 positioned at the first lift stop position LS1 having the delivery vehicle 3c arranged on the lifting arrangement 5. The first lift stop position LS1 is at the same vertical level as the second lift stop position 370 and first delivery rail system 308. The first lift stop position has established access between the lifting arrangement 5 and the second location 370 allowing the delivery vehicle 3c to move between the first lift stop position LS1 and the second location 370.

FIG. 7 illustrates the same part of the system as illustrated in FIG. 6, but where the lifting arrangement is positioned between the first and second lift stop position LS1, LS2.

FIG. 8 illustrates the same part of the system as illustrated in FIGS. 6 and 7, but where the lifting arrangement is positioned at lift stop position LS2. The second lift stop position LS2 is at the same vertical level as the third location 380 and the second delivery rail system 308'. The second lift stop position LS2 has established access between the lifting arrangement 5 and the third location 380 allowing the delivery vehicle 3c to move from the second lift stop position LS2 to the third location 380.

After the delivery vehicle 3c has been removed from the lifting arrangement 5, the lifting arrangement 5 may wait for a second delivery vehicle 3c to enter the lifting arrangement 5 to transfer the second delivery vehicle 3c to the first delivery rail system 308, or it may return empty to load a second delivery vehicle 3c from the first delivery rail system 308.

Figure 9:
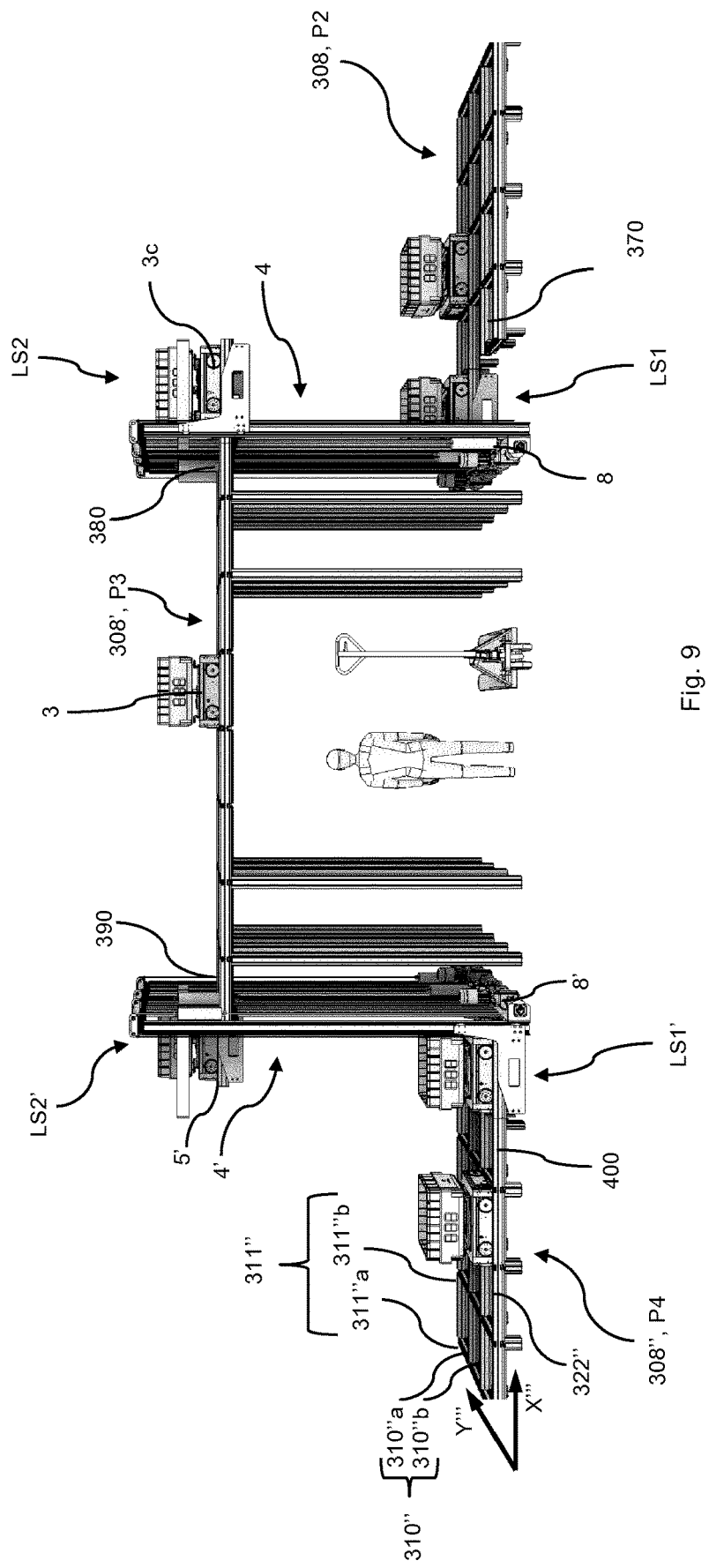
FIG. 9 is a perspective view of a vehicle transport system according to an exemplary embodiment of the invention having two vehicle lift devices.

FIG. 9 illustrates a part of the system comprising a first, second and third delivery rail system 308, 308', 308". The first automated storage and retrieval grid is not shown.

The first delivery rail system 308 is arranged in the second horizontal plane P2 at the same vertical level as the third delivery rail system 308" arranged in the fourth horizontal plane P4. The second delivery rail system 308' arranged in the third horizontal plane P3 is vertically displaced from the first and third delivery rail system 308, 308" and arranged therebetween. The second delivery rail system may work as an overpass/bridge rail system within a storage house as shown.

The system 1 has two vehicle lift devices 4, 4' for transferring delivery vehicles 3c. The first vehicle lift device 4 transfers delivery vehicles 3c between the first delivery rail system 308 and the second delivery rail system 308', while the second vehicle lift device 4' transfers delivery vehicles 3c between the second delivery rail system 308' and the third delivery rail system 308".

The first and second delivery rail system 308, 308' has the same configuration as shown in FIGS. 5 to 8 comprising sets of parallel rails forming a grid pattern.

The third delivery rail system 308" also comprises a grid pattern. The grid pattern is formed by a first and a second set of parallel rails 310", 311" extending in the seventh direction X" and eights direction Y" respectively, where the seventh direction is orthogonal to the eights direction X". The first and second set of parallel rails 310", 311" have a plurality of adjacent grid cells 322" defined by a pair of neighboring rails 310"a, 310"b of the first set of parallel rails 310", and a pair of neighboring rails 311"a, 311"b of the second set of parallel rails 311".

The delivery vehicle 3c can be transferred between the first and second delivery rail systems 308, 308' and between the second and third delivery rail system 308', 308".

When moving the delivery vehicle 3c from for example the second location to a fifth location 400, the lifting arrangement 5 of the first vehicle lift device 4 will first be arranged at the first lift stop position LS1 establishing access between the lifting arrangement 5 and the second location 370 of the first delivery rail system 308, thereby enabling relocation of the delivery vehicle 3c between the operative position on the first delivery rail system 308 and the support position on the lifting arrangement 5. After the delivery vehicle 3c rests at the support position of the lifting arrangement, the vehicle lift device 4 will transfer the lifting arrangement 5 with the delivery vehicle 3c to the second lift stop position LS2 establishing access between the lifting arrangement 5 and the third location 380 of the second delivery rail system 308', thereby enabling relocation of the delivery vehicle 3c between the support position on the lifting arrangement 5 and the operative position on the second delivery rail system 308'.

The delivery vehicle 3c may then move on the second delivery rail system 308' to the fourth location 390 being adjacent the second lift stop position LS2' of the second vehicle lift device 4'. When the lifting arrangement of the second vehicle lift device is arranged in the second lift stop position LS2' access will be established between the lifting arrangement 5' of the second vehicle lift device 4' and the fourth location 390 of second delivery rail system 308', thereby enabling relocation of the delivery vehicle 3c from the operative position on the second delivery rail system 308' to the support position on the lifting arrangement 5'. Thereafter the lifting arrangement 5' with the delivery vehicle 3c can be transferred to the first lift stop position LS1' of the second vehicle lift device 4' establishing access between the lifting arrangement 5' and the fifth location of the third delivery rail system 308", thereby enabling relocation of the delivery vehicle 3c from the support position on the lifting arrangement 5' and the operative position on the third delivery rail system 308".

The second lift stop position LS2 of the first vehicle lift device 4 and second lift stop position LS2' of the second vehicle lift device 4' are arranged at the outer perimeter of the second delivery rail system 308'. In FIG. 9 the two lift stops positions LS2 and LS2' are arranged at the opposite sides of the second delivery rail system 308'.

However, the two lift stop positions LS2 and LS2' can be arranged at any position on the outer perimeter of the second delivery rail system 308' depending on the position of the first and third delivery rail system 308, 308" relative to the second delivery rail system 308' for the vehicle lift devices 4,4' to transfer a delivery vehicle 3c there between.

Figure 10:
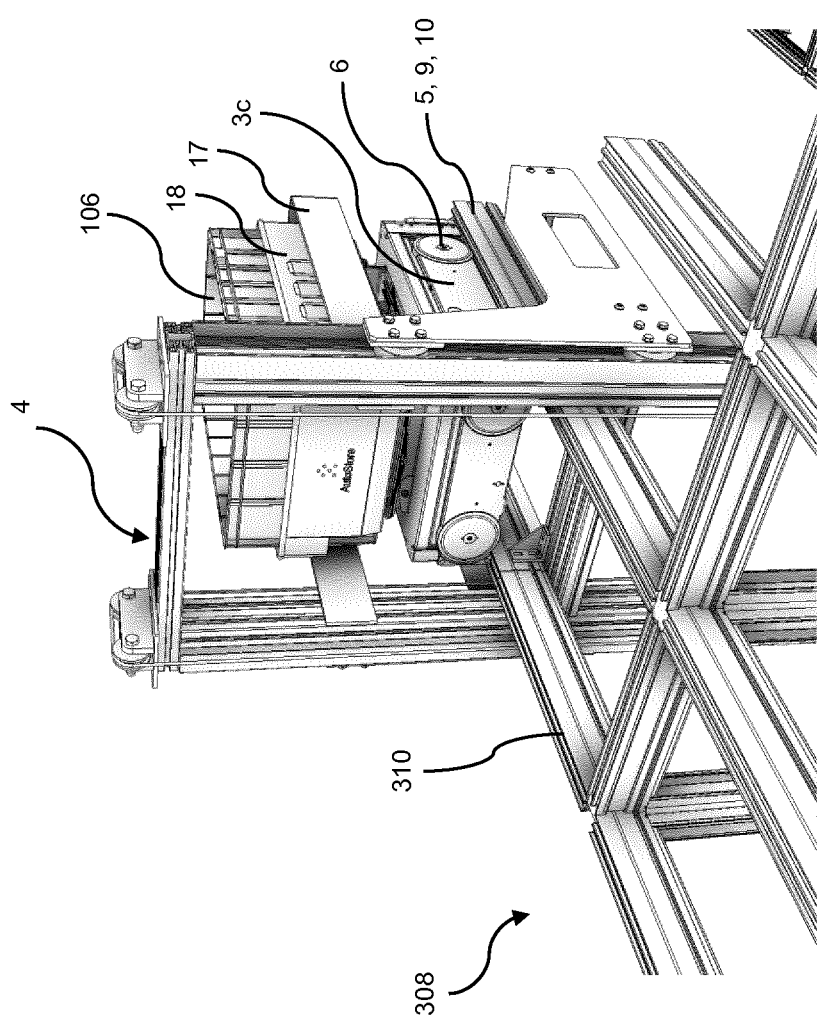
FIG. 10 is a detailed view of a delivery vehicle positioned on the lifting arrangement of the vehicle lift device located at a lift stop position.

FIG. 10 is a detailed view of the delivery vehicle 3c arranged on the lifting arrangement 5 in the first lift stop position LS1 in FIG. 6. The lifting arrangement 5 has a guiding and positioning structure comprising a platform rail arrangement 9 having one first set of parallel rails 10. In this position access is established between the lifting arrangement 5 and the first delivery rail system 308 enabling relocation of the delivery vehicle 3c between the operative position on the first delivery rail system 308 and the support position on the lifting arrangement 5. The rails 10 of the lifting arrangement 5 are compatible with the rails 310 of the first delivery rail system 308. The rails 10 of the lifting arrangement 5 can be seen as an extension of the corresponding first set of parallel rails 310 of the first delivery rail system 308. The delivery vehicle 3c can therefore easily be moved by the wheels 6 being engaged with the parallel set of rails 310 from the first delivery rail system 308 on to the parallel set of rails 10 of the lifting arrangement 5.

A first safety barrier 17 is shown being in the form of a safety loop. When the delivery vehicle 3c moves from the first delivery rail system 308 on to the lifting arrangement 5 of the vehicle lift device 4, the safety barrier 17 prevents the delivery vehicle 3c from moving off the lifting arrangement 5.

The delivery vehicle 3c has a storage container carrier 18 on top of its chassis carrying the storage container 106.

The delivery vehicle 3c may be a remotely operating vehicle comprising a wheel arrangement of eight wheels 6, wherein a first set of four wheels enable the lateral movement of the delivery vehicle 3c along the rails of the first and second delivery rail system 308, 308'. One or both sets of wheels 6 in the wheel arrangement can be lifted and lowered, so that the first set of wheels and/or the second set of wheels can be engaged with the respective set of rails at any one time.

FIG. 11 shows the first automated storage and retrieval grid 204 and the first delivery rail system 308 shown in FIGS. 4 and 5. Further, FIG. 11 shows the second delivery rail system 308' arranged at a third level P3 below a second container handling vehicle rail system 208' of a second automated storage and retrieval grid 204'. The second automated storage and retrieval grid 204' has the same configuration as the first automated storage and retrieval grid 204 shown in FIG. 5 having a plurality of vertical members forming a plurality of storage columns 205' for storing storage containers in stacks (not shown). The vertical members are interconnected at their upper ends by the container handling vehicle rail system 208'. The second transfer rail system further comprises a plurality of transfer columns 219 for transferring storage containers between the container handling vehicle 3a moving on the second container handling vehicle rail system 208' and the delivery vehicle 3c moving on the second delivery rail system 308'.

The vehicle lift device 4 coincides with a part of the outer circumference of the first delivery rail system 308 and a part of the outer circumference of the second delivery rail system 308', and is arranged to transfer the delivery vehicle 3c between the first and second delivery rail system 308, 308'.

The system 1 may further comprise an operator access station (not shown) adjacent to at least one side of first and/or second delivery rail systems 308, 308'.

FIG. 12 shows system 1 for storing and transporting storage containers having a first automated storage and retrieval grid 204 as shown in FIGS. 4 and 5 having the first delivery rail system 308 arranged below the container handling vehicle rail system 208. The first delivery rail system 308 comprises a delivery vehicle 3c to be transported by the vehicle lift device 4. The system 1 further comprises a second automated storage and retrieval grid 204' having a third delivery rail system 308" arranged below the top rail grid 208' in a fourth level P4. Between the first and the second container handling vehicle rail system 208, 208', a second delivery rail system 308' is arranged. In order to transport a delivery vehicle 3c between the first and third delivery rail systems 308,308", two vehicle lift devices 4,4' are arranged within the system.

The first vehicle lift device 4 transfers delivery vehicles 3c between the first delivery rail system 308 and the second delivery rail system 308', while the second vehicle lift device 4' transfers delivery vehicles 3c between the second delivery rail system 308' and the third delivery rail system 308".

When moving the delivery vehicle 3c from the first delivery rail system 308 to the second delivery rail system 308', the lifting arrangement 5 of the first vehicle lift device 4 will be arranged at the first lift stop position LS1 establishing access between the lifting arrangement 5 and the first delivery rail system 308, thereby enabling relocation of the delivery vehicle 3c between the operative position on the first delivery rail system 308 the support position on the lifting arrangement 5. Then the vehicle lift device 4 will transfer the lifting arrangement 5 with the delivery vehicle 3c to the second lift stop position LS2 establishing access between the lifting arrangement 5 and the second delivery rail system 308', thereby enabling relocation of the delivery vehicle 3c between the support position on the lifting arrangement 5 and the operative position on the second delivery rail system 308'.

The delivery vehicle 3c may then move on the second delivery rail system 308' towards a second lift stop position LS2' of the second vehicle lift device 4' establishing access between the lifting arrangement 5' of the second vehicle lift device 4' and the second delivery rail system 308', thereby enabling relocation of the delivery vehicle 3c from the operative position on the second delivery rail system 308' to the support position on the lifting arrangement 5'. Thereafter the lifting arrangement 5' with the delivery vehicle 3c can be transferred to the first lift stop position LS1' of the second vehicle lift device 4' establishing access between the lifting arrangement 5' and the third delivery rail system 308", thereby enabling relocation of the delivery vehicle 3c from the support position on the lifting arrangement 5' and the operative position on the third delivery rail system 308".

The second lift stop position LS2 of the first vehicle lift device 4 and second lift stop position LS2' of the second vehicle lift device 4' are arranged at the outer perimeter of the second delivery rail system 308'. The two lift stops positions LS2 and LS2' are arranged at the opposite sides of the outer perimeter of the second delivery rail system 308' being in the same level, P3 which is in the same level as the first horizontal plane P1.

However, the two lift stop positions LS2 and LS2' can be arranged at any position on the outer perimeter of the second delivery rail system 308' depending on the position of the first and third delivery rail system 308,308" relative to the second delivery rail system 308' for the vehicle lift device 4 to transfer the delivery vehicle 3c there between.

Depending on the size and shape of the facility wherein the system 1 is arranged, a plurality of combinations of arrangements of delivery rail systems are possible. FIGS. 11 and 12 are illustrating two of a multiple of possible arrangements and show the flexibility of a facility comprising a system according to the invention.

REFERENCE NUMERALS

| | |
|---|---|
| 1 | System |
| 3a | Storage container handling vehicle, container handling vehicle |
| 3c | Delivery vehicle |
| 4 | Vehicle lift device, first vehicle lift device |
| 4' | Second vehicle lift device |
| 5 | Lifting arrangement |
| 6 | Wheels |
| 8 | Lift mechanism |
| 9 | Platform rail arrangement |
| 10 | first set of parallel rails of platform rail arrangement 9 |
| 17 | Safety barrier/safety loop |
| 18 | Storage container carrier |
| 100 | Prior art automated storage and retrieval system |
| 102 | Upright/vertical members of the storage grid 104 |
| 103 | Horizontal members of storage grid 104 |
| 104 | storage grid/storage grid structure/three-dimensional grid |
| 105 | Storage column |
| 106 | Storage container |
| 107 | Stack |
| 108 | Rail system/top rail grid |
| 110 | First set of parallel rails in first direction X |
| 110a, 110b | Pair of parallel rails forming the set of parallel rails 110 |
| 111 | Second of parallel rails in second direction Y |
| 111a, 111b | Pair of parallel rails forming the set of parallel rails 111 |
| 112 | Grid columns |
| 115 | Grid opening of storage grid 104 |
| 119 | First delivery column/delivery column |
| 120 | Transfer column |
| 122 | Grid cell/storage cell |
| 202 | Vertical members of first transfer rail storage system |
| 204 | First automated storage and retrieval grid/automated storage and retrieval grid |

| | |
|---|---|
| 204' | Second automated storage and retrieval grid |
| 205 | Storage column of first automated storage and retrieval grid |
| 205' | Storage columns of second automated storage and retrieval grid |
| 208 | Container handling vehicle rail system of first automated storage and retrieval grid |
| 208' | Container handling vehicle rail system of second automated storage and retrieval grid |
| 210 | First set of parallel rails extending in the first direction X of the container handling vehicle rail system 208 |
| 210a, 210b | Neighboring rails of the first set of rails 210 |
| 211 | Second set of parallel rails extending in the second direction Y of container handling vehicle rail system 208 |
| 211a, 211b | Neighboring rails of the second set of rails 211 |
| 215 | Container handling vehicle grid opening |
| 219 | Transfer column |
| 220 | Delivery space |
| 222 | Container handling vehicle grid cells |
| 308 | First delivery rail system |
| 308' | Second delivery rail system |
| 308" | Third delivery rail system |
| 310 | First set of parallel rails extending in the third direction X' |
| 310' | First set of parallel rails extending in the fifth direction X" |
| 310" | First set of parallel rails extending in the seventh direction X'" |
| 310a, 310b | Neighboring rails of the first set of rails 310 |
| 310'a, 310'b | Neighboring rails of the first set of rails 310' |
| 310"a, 310"b | Neighboring rails of the first set of rails 310" |
| 311 | Second set of parallel rails extending in the fourth direction Y' |
| 311' | second set of parallel rails extending in the sixth direction Y" |
| 311" | second set of parallel rails extending in the eights direction Y'" |
| 311a, 311b | Neighboring rails of the second set of rails 311 |
| 311'a, 311'b | Neighboring rails of the second set of rails 311' |
| 311"a, 311"b | Neighboring rails of the second set of rails 311" |
| 322 | Grid cell of first delivery rail system 308 |
| 322' | Grid cell of second delivery rail system 308' |
| 322" | Grid cell of third delivery rail system 308' |
| 360 | Storage container delivery location |
| 370 | Second location |
| 380 | Third location |
| 390 | Fourth location |
| 400 | Fifth location |
| X | First direction |
| X' | Third direction |
| X" | Fifth direction |
| X'" | Seventh direction |
| Y | Second direction |
| Y' | Fourth direction |
| Y" | Sixth direction |
| Y'" | Eighth direction |
| P | Horizontal plane |
| P1 | Horizontal plane of the container handling vehicle rail system 208 |
| P2 | Horizontal plane of the first delivery rail system 308 |
| P3 | Horizontal plane of the second delivery rail system 308' |
| P4 | Horizontal plane of the third delivery rail system 308" |
| LS1 | First lift stop position of lift device 4 |
| LS1' | First lift stop position of second lift device 4' |
| LS2 | Second lift stop position of lift device 4 |
| LS2' | Second lift stop position of second lift device 4' |

The invention claimed is:

1. A system for storing and transporting storage containers comprising:
an automated storage and retrieval grid comprising:
vertical members defining multiple storage columns for storing storage containers on top of each other in vertical stacks,
at least one container handling vehicle,
wherein the vertical members are interconnected at their upper ends by a container handling vehicle rail system arranged to guide the at least one container handling vehicle being configured to raise storage containers from, and lower storage containers into, the storage columns, and to transport the storage containers above the storage columns,
wherein the container handling vehicle rail system comprises a first set of parallel rails arranged in a first horizontal plane and extending in a first direction, and a second set of parallel rails arranged in the first horizontal plane and extending in a second direction which is orthogonal to the first direction, which first and second sets of rails form a grid pattern in the first horizontal plane comprising a plurality of adjacent container handling vehicle grid cells, each container handling vehicle grid cell comprising a container handling vehicle grid opening defined by a pair of neighboring rails of the first set of rails and a pair of neighboring rails of the second set of rails,
a transfer column adapted for transport of a storage container between the at least one container handling vehicle and a delivery space situated at a lower end of the transfer column;
a delivery system comprising a first delivery rail system having at least one set of parallel rails arranged in a second horizontal plane guiding at least one delivery vehicle thereon, wherein the delivery vehicle is adapted to receive and/or deliver a storage container at a storage container delivery location arranged below the delivery space of the transfer column and to move between the storage container delivery location and a second location, the first delivery rail system covers at least an area extending from the storage container delivery location to the second location, a vehicle lift device for transfer of the at least one delivery vehicle between a first lift stop position adjacent the second location in the second horizontal plane and a second lift stop position adjacent a third location arranged in a third horizontal plane being at a different vertical level than the second horizontal plane.

2. The system according to claim 1, wherein the vehicle lift device comprises a lifting arrangement arranged to support the at least one delivery vehicle and a lift mechanism arranged to move the lifting arrangement between a first lift stop position to a second lift stop position, wherein the first lift stop position establishes access between the lifting arrangement and the second location for enabling relocation of the at least one delivery vehicle between a support position on the lifting arrangement and an operative position at the second location on the first delivery rail system, and the second lift stop position establishes access between the lifting arrangement and the third location for enabling relocation of the at least one delivery vehicle between the support position on the lifting arrangement and an operative position at the third location.

3. The system according to claim 2, wherein the lift mechanism is configured to move the lifting arrangement in a purely vertical direction between the first lift stop position and the second lift stop position.

4. The system according to claim 2, wherein the lifting arrangement comprises a guiding and positioning structure for maintaining the at least one vehicle in a near motionless position on the lifting arrangement during transfer of the lifting arrangement between the first and second lift stop position.

5. The system according to claim 4, wherein the guiding and positioning structure comprises:
a platform rail arrangement comprising:
at least a first set of parallel rails, and
at least a second set of parallel rails being perpendicular to the first set of parallel rails,
wherein the platform rail arrangement is level with the first delivery rail system when the lifting arrangement is placed in the first lift stop position thereby enabling the at least one delivery vehicle to move between the first delivery rail system and the platform rail arrangement, and the platform rail arrangement is level with a second delivery rail system at the third location when the lifting arrangement is placed in the second lift stop position thereby enabling the at least one delivery vehicle to move between the second delivery rail system and the platform rail arrangement.

6. The system according to claim 5, wherein the horizontal extent of the platform rail arrangement is equal to or larger than the horizontal extent of the at least one delivery vehicle to be transferred between the first lift stop position and the second lift stop position.

7. The system according to claim 5, wherein second delivery rail system comprises at least one set of parallel rails arranged in the third horizontal plane guiding at least one delivery vehicle thereon, the second delivery rail system extending from the third location to a fourth location.

8. The system according to claim 7, wherein second delivery rail system comprises a first set of parallel rails arranged in the third horizontal plane and extending in a fifth direction, and a second set of parallel rails arranged in the third horizontal plane and extending in a sixth direction which is orthogonal to the fifth direction, which first and second sets of rails form a grid pattern.

9. The system according to claim 7, wherein it the first horizontal plane is at the same level as the third horizontal plane.

10. The system according to claim 7, wherein the system further comprises a second vehicle lift device for transfer of the at least one delivery vehicle between the fourth location on the second delivery rail system and a fifth location arranged in a fourth horizontal plane being at a different vertical level than the third horizontal plane.

11. The system according to claim 10, wherein the fourth horizontal plane is at the same level as the second horizontal plane.

12. The system according to claim 4, wherein the guiding and positioning structure comprises a base plate structure for receiving the at least one delivery vehicle.

13. The system according to claim 2, wherein lifting arrangement comprises at least two side walls for receiving the at least one delivery vehicle in the area defined by the at least two side walls and the guiding and positioning structure.

14. The system according to claim 1, wherein the lift device further comprises a first safety barrier configured to restrict further horizontal movement of the at least one delivery vehicle when the at least one delivery vehicle is moving to or from the support position.

15. The system according to claim 1, wherein the vehicle lift device further comprises a second safety barrier extending vertically for restricting horizontal displacement of the at least one delivery vehicle when the platform is moving between the first lift stop position and the second lift stop position.

16. The system according to claim 1, wherein the first delivery rail system comprises a first set of parallel rails arranged in the second horizontal plane and extending in a third direction, and a second set of parallel rails arranged in the second horizontal plane and extending in a fourth direction which is orthogonal to the third direction, which first and second sets of rails form a grid pattern.

17. The system according to claim 1, wherein the delivery vehicle comprises a storage container carrier provided above a chassis of the delivery vehicle.

18. The system according to claim 1, wherein the third location comprises an interface configured to connect to a third-party storage, production and distribution system.

19. A building comprising a system according to claim 1, wherein the second and third horizontal plane represent floors at different levels within the building.

20. A method of operating a system for storing and transporting storage containers comprising:
an automated storage and retrieval grid comprising:
vertical members defining multiple storage columns for storing storage containers on top of each other in vertical stacks,
wherein the vertical members are interconnected at their upper ends by a container handling vehicle rail system arranged to guide at least one container handling vehicle being configured to raise storage containers from, and lower storage containers into, the storage columns, and to transport the storage containers above the storage columns, wherein the container handling vehicle rail system comprises a first set of parallel rails arranged in a first horizontal plane and extending in a first direction, and a second set of parallel rails arranged in the first horizontal plane and extending in a second direction which is orthogonal to the first direction, which first and second sets of rails form a grid pattern in the first horizontal plane comprising a plurality of adjacent container handling vehicle grid cells, each container handling vehicle grid cell comprising a container handling vehicle grid opening defined by a pair of neighboring rails of the first set of rails and a pair of neighboring rails of the second set of rails, a transfer column adapted for transport of a storage container between the container handling vehicle and a delivery space situated at a lower end of the transfer column;

a delivery system comprising a first delivery rail system having at least one set of parallel rails arranged in a second horizontal plane guiding at least one delivery vehicle thereon, wherein the delivery vehicle is adapted to receive or deliver a storage container at a storage container delivery location arranged below the delivery space of the transfer column and to move between the storage container delivery location and a second location, the first delivery rail system is at least covering an area extending from the storage container delivery location to the second location, a vehicle lift device for transfer of the at least one delivery vehicle between the second location and a third location arranged in a third horizontal plane being at a different vertical level than the second horizontal plane, wherein method comprises:
i) moving the delivery vehicle from the second location onto a first lift position of the vehicle lift device,
ii) moving the delivery vehicle to a second lift stop position of the vehicle lift device enabling access between the vehicle lift device and the third location, and
iii) moving the delivery vehicle to the third location.

21. The method of operating a system according to claim 20, the method prior to step i) comprises the steps of:
a) moving the container handling vehicle to a location on the container handling vehicle rail system for transferring a storage container into the transfer column,
b) moving the delivery vehicle to the storage container delivery location,
c) transferring the storage container from the container handling vehicle through the transfer column to the delivery space and on to the delivery vehicle,
d) moving the delivery vehicle from the storage container delivery location to the second location to thereby move the storage container.

22. The method in accordance with claim 20, wherein the method further comprises:
iv) moving the delivery vehicle to an access area for handling the storage container by a robotic operator and/or a human operator.

* * * * *